United States Patent
Oh

(10) Patent No.: US 9,910,318 B2
(45) Date of Patent: Mar. 6, 2018

(54) LIQUID CRYSTAL DISPLAY DEVICE AND METHOD OF MANUFACTURING THE SAME

(71) Applicant: Samsung Display Co. Ltd., Yongin (KR)

(72) Inventor: Keun Chan Oh, Cheonan-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 158 days.

(21) Appl. No.: 15/002,084

(22) Filed: Jan. 20, 2016

(65) Prior Publication Data

US 2017/0031214 A1    Feb. 2, 2017

(30) Foreign Application Priority Data

Jul. 28, 2015  (KR) .......................... 10-2015-0106567

(51) Int. Cl.
    *G02F 1/1337*    (2006.01)
    *G02F 1/1341*    (2006.01)
    *G02F 1/1362*    (2006.01)

(52) U.S. Cl.
    CPC ...... *G02F 1/133723* (2013.01); *G02F 1/1341* (2013.01); *G02F 1/133707* (2013.01); *G02F 1/133753* (2013.01); *G02F 1/133788* (2013.01); *G02F 1/13624* (2013.01);
    (Continued)

(58) Field of Classification Search
    CPC ......... G02F 1/133723; G02F 1/133707; G02F 1/133753; G02F 1/133788; G02F 1/1341; G02F 1/13624
    See application file for complete search history.

(56) References Cited

U.S. PATENT DOCUMENTS 5,654,780 A  *  8/1997  Hasegawa ......... G02F 1/133753
                                                  349/124
8,698,981 B2 *  4/2014  Kameyama .......... G02B 5/3033
                                                  349/96
(Continued)

FOREIGN PATENT DOCUMENTS

JP    2004302061     10/2004
KR    1020130059758   6/2013
KR    1020140036948   3/2014
(Continued)

*Primary Examiner* — Anne Hines
(74) *Attorney, Agent, or Firm* — Cantor Colburn LLP

(57) ABSTRACT

A liquid crystal display (LCD) device and method of manufacturing the same are provided. The LCD comprises, a first substrate, a second substrate facing the first substrate, a liquid crystal layer interposed between the first substrate and the second substrate and includes liquid crystal molecules, an alignment film disposed between the liquid crystal layer and the first substrate, a pixel electrode disposed between the alignment film and the first substrate, a photo-curable layer between the liquid crystal layer and the alignment films, a common electrode disposed between the liquid crystal layer and the second substrate, and a vertical alignment inducing layer between the common electrode and the liquid crystal layer. The vertical alignment inducing layer includes a self-aligned vertical alignment inducer, and the vertical alignment inducer includes a hydrophilic group, and an affinity liquid crystal group having high affinity with the liquid crystal molecules.

12 Claims, 22 Drawing Sheets

(52) U.S. Cl.
CPC ............ *G02F 2001/133726* (2013.01); *G02F 2001/133742* (2013.01); *G02F 2001/133757* (2013.01)

(56) References Cited

U.S. PATENT DOCUMENTS

| | | | | |
|---|---|---|---|---|
| 2006/0098137 | A1* | 5/2006 | Kameyama | G02B 5/3033 349/96 |
| 2009/0002608 | A1* | 1/2009 | Kameyama | G02B 5/3033 349/96 |

FOREIGN PATENT DOCUMENTS

| | | |
|---|---|---|
| KR | 1020150012093 | 2/2015 |
| KR | 1020150016462 | 2/2015 |
| TW | 200835954 | 9/2008 |

\* cited by examiner

LIQUID CRYSTAL DISPLAY DEVICE AND METHOD OF MANUFACTURING THE SAME

This application claims priority from Korean Patent Application No. 10-2015-0106567 filed on Jul. 28, 2015, and all the benefits accruing therefrom under 35 U.S.C. § 119, the content of which in its entirety is herein incorporated by reference.

BACKGROUND

1. Field of the Invention

The invention relates to a liquid crystal display device and a method of manufacturing the liquid crystal display device.

2. Description of the Related Art

Liquid crystal display devices are widely used in flat panel display devices, and include two substrates having field generating electrodes such as a pixel electrode and a common electrode, and a liquid crystal layer interposed between the substrates.

The liquid crystal display device applies a voltage to the field generating electrode to generate an electric field in the liquid crystal layer, determines the alignment direction of the liquid crystals within the liquid crystal layer through the electric field, and displays an image by controlling the polarization of incident light.

When the liquid crystal display device is used as a display device for a television receiver, the size of the screen is increased. In this way, as the size of the liquid crystal display device increases, visual differences may also be increased depending on whether a viewer sees a central portion of the screen or whether a viewer sees both left and right ends of the screen.

To compensate for these visual differences, the liquid crystal display device may be formed into a curved shape by bending into a concave or convex shape. The curved liquid crystal display device may be a portrait type which has a vertical length longer than a horizontal as observed from the perspective of a viewer, and is bent in a vertical direction. The curved liquid crystal display may also be a landscape type which has a vertical length shorter than a horizontal length and is bent in a horizontal direction.

SUMMARY

In a curved liquid crystal display device or a flexible liquid crystal display device, as a display panel is bent, misalignment may occur between an upper substrate and a lower substrate. As a result, a vertical line dark portion is visible within a pixel region. Further, the vertical line dark portion of the pixel region may be recognized as dirt by when observed by a viewer, or may be a reddish phenomenon in which colors are recognized as being reddish.

An aspect of the present invention provides a liquid crystal display device capable of improving a display quality even in a curved or flexible liquid crystal display device.

Another aspect of the present invention provides a method of manufacturing the liquid crystal display device capable of improving the display quality.

In various embodiments, the liquid crystal display (LCD) device includes, a first substrate, a second substrate facing the first substrate, a liquid crystal layer interposed between the first substrate and the second substrate and including liquid crystal molecules, an alignment film disposed between the liquid crystal layer and the first substrate, a pixel electrode disposed between the alignment film and the first substrate, a photo-curable layer between the liquid crystal layer and the alignment films, a common electrode disposed between the liquid crystal layer and the second substrate, and a vertical alignment inducing layer between the common electrode and the liquid crystal layer, wherein the vertical alignment inducing layer includes a self-aligned vertical alignment inducer, and the vertical alignment inducer includes a hydrophilic group, and an affinity liquid crystal group having a high affinity with the liquid crystal molecules.

In an exemplary embodiment, the vertical alignment inducing layer may be disposed on a surface of the common electrode.

In an exemplary embodiment, the hydrophilic group of the vertical alignment inducer may be aligned in a direction of the common electrode, the affinity liquid crystal group of the vertical alignment inducer may be aligned in the direction of the liquid crystal layer, and the vertical alignment inducer may be self-aligned vertically with respect to the surface of the common electrode.

In an exemplary embodiment, the hydrophilic group may include one or more of a hydroxyl group, an amino group and a thiol group.

In an exemplary embodiment, the alignment film may comprise include polyimide having a main chain and one or more side chain, the polyimide may include an a repeating unit of a main chain including an imide group, and at least a portion of the side chain may include a side chain substituted by a vertical alignment group and a side chain substituted by a polymerization initiator.

In an exemplary embodiment, the photo-curable layer may be a reaction product of a photo-curable agent and the polymerization initiator.

In an exemplary embodiment, the photo-curable agent may include a reactive mesogen.

In an exemplary embodiment, the side chain substituted by the vertical alignment group may have a pre-tilt.

In an exemplary embodiment, the liquid crystal molecules may have negative dielectric anisotropy, the liquid crystal molecules include first liquid crystal molecules adjacent to the photo-curable layer, and second liquid crystal molecules adjacent to the vertical alignment inducing layer, the first liquid crystal molecules may have a first pre-tilt angle with respect to the first substrate in an initial state in which no electric field is formed, and the second liquid crystal molecules may have a second pre-tilt angle smaller than the first pre-tilt angle with respect to the second substrate.

In an exemplary embodiment, the second pre-tilt angle may be from 0° to about 2° or less.

In an exemplary embodiment, the pixel electrode may be a pattern electrode having a slit pattern, and the pixel electrode may include a plurality of domains in which alignment directions of the liquid crystal molecules are different from each other.

In an exemplary embodiment, one or more of the first substrate and the second substrate may be bent.

According to other embodiments, a method of manufacturing a LCD device includes, preparing a first substrate having a pixel electrode formed on an upper surface of the first substrate, forming an alignment film on the pixel electrode, preparing a second substrate having an common electrode formed on an upper surface of the second substrate and disposing the second substrate such that the common electrode faces the alignment film, interposing a liquid crystal layer including a vertical alignment inducer between the alignment film and the common electrode, forming a vertical alignment inducing layer from the vertical alignment inducer, forming an electric field between the pixel electrode and the common electrode, and irradiating light in the presence of the electric field to form a photo-curable layer on the surface of the alignment film.

In an exemplary embodiment, the liquid crystal layer may include a photo-curable agent.

In an exemplary embodiment, the photo-curable layer may be formed by polymerization of the photo-curing agent present in the liquid crystal layer.

In an exemplary embodiment, the alignment film may comprise a photo-curable agent.

In an exemplary embodiment, the photo-curable layer formed may be formed by polymerization of the photo-curing agent present in the alignment film.

In an exemplary embodiment, the vertical alignment inducer may be a linear molecule having a hydrophilic group capable of hydrogen bonding at one end, and an affinity crystal group having a high affinity with the liquid crystal molecules at the other end, where the end having the hydrophilic group may be aligned in the direction of the common electrode, and the end having the affinity crystal group may be aligned in the direction of the liquid crystal layer to form a vertical alignment inducing layer on the surface of the common electrode.

In an exemplary embodiment, may further comprise irradiating light in the absence of the electric field after the forming of the photo-curable layer.

In an exemplary embodiment, the liquid crystal molecules adjacent to the photo-curable layer have a first pre-tilt angle, and the liquid crystal molecules adjacent to the vertical alignment inducing layer have a second pre-tilt angle smaller than the first pre-tilt angle.

The liquid crystal display device of the present invention is capable of substantially vertically aligning the liquid crystal molecules adjacent to the upper substrate, and aligning the liquid crystal molecules adjacent to the lower substrate in a pre-tilt manner. Accordingly, it is possible to improve light transmittance and to minimize the texture due to the misalignment.

Moreover, it is possible to set the different pre-tilts of the liquid crystal molecules adjacent to the upper substrate and the liquid crystal molecules adjacent to the lower substrate without using different alignment films on the upper substrate and the lower substrate. The process thus can be simplified to reduce costs.

Also, it is possible to provide a liquid crystal display device with improved reliability, by alleviating the dirt or the reddish phenomenon generated in the display panel.

Effects according to the aspects of the present invention are not limited by the contents illustrated above, and further various effects are also included herein.

BRIEF DESCRIPTION OF THE DRAWINGS

The above and other advantage and features of this disclosure will become more apparent by describing in detail exemplary embodiments thereof with reference to the attached drawings, in which.

DETAILED DESCRIPTION

Figure 1:
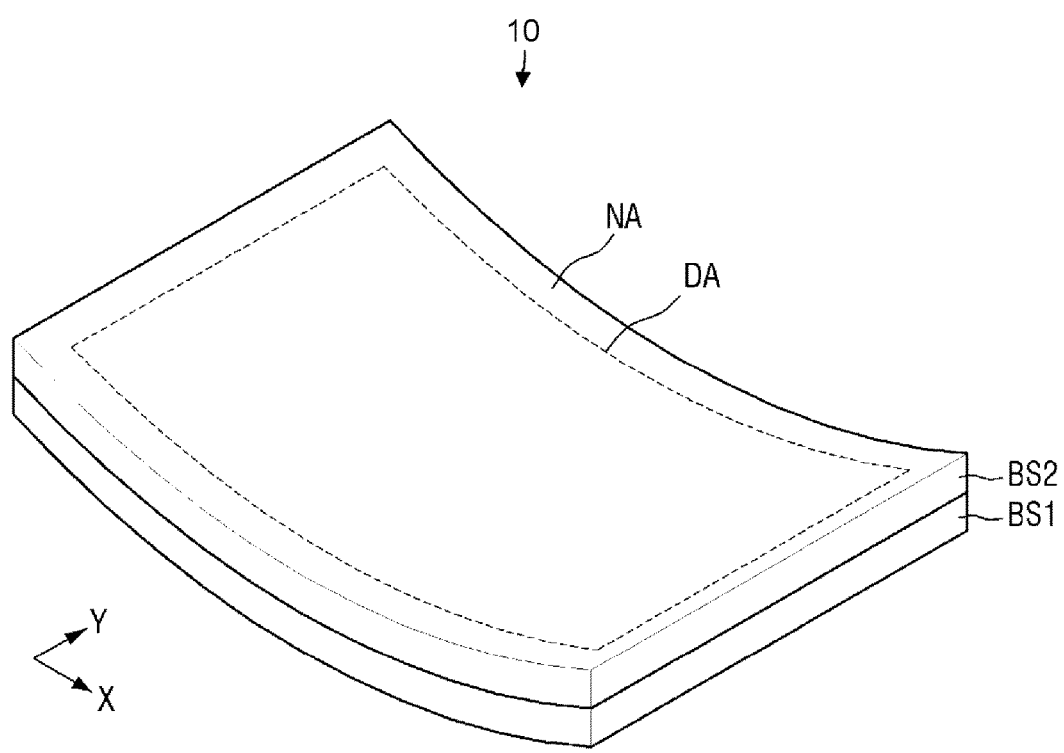
FIG. 1 is a perspective view of an exemplary embodiment of a curved liquid crystal display device according to the present invention.

Features of the inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer, or intervening elements or layers may be present therebetween. In contrast, when an element is referred to as being "directly on," "directly connected to" or "directly coupled to" another element or layer, there are no intervening elements or layers present. As used herein, "connected" refers to elements being physically, electrically and/or fluidly connected to each other.

Like numbers refer to like elements throughout. As used herein, the term "and/or" includes any and all combinations of one or more of the associated listed items.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first element," "component," "region," "layer" or "section" discussed below could be termed a second element, component, region, layer or section without departing from the teachings of the invention.

Spatially relative terms, such as "below," "lower," "bottom," "under," "above," "top," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present invention will be described with reference to the attached drawings.

Figure 2:
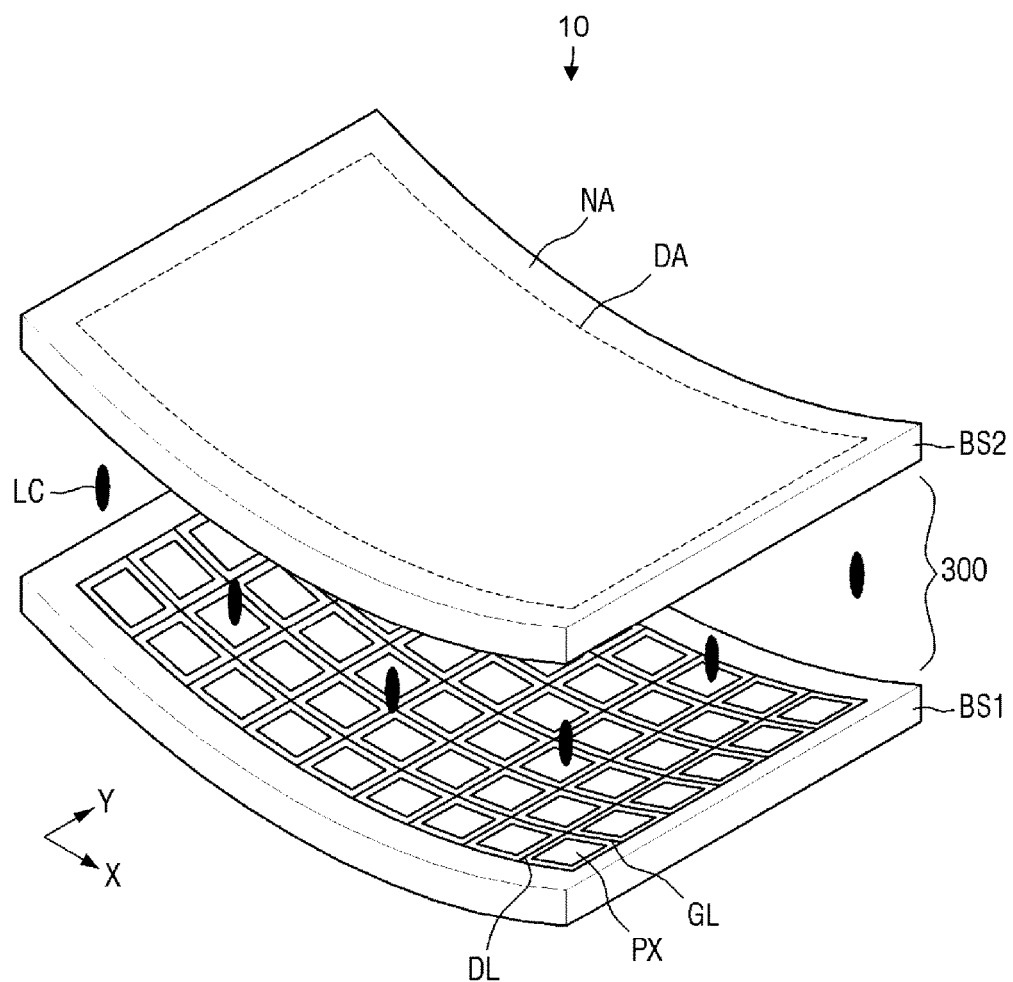
FIG. 2 is an exploded perspective view of the liquid crystal display device of FIG. 1.

FIG. 1 is a perspective view of an exemplary embodiment of a liquid crystal display device. FIG. 2 is a schematic exploded perspective view of the liquid crystal display device of FIG. 1.

Referring to FIGS. 1 and 2, a liquid crystal display device 10 includes a first substrate BS1, a second substrate BS2 which faces the first substrate BS1 and is spaced apart from the first substrate BS1, and a liquid crystal layer 300 interposed between the first substrate BS1 and the second substrate BS2. The first and second substrates BS1, BS2 are a transparent or an opaque insulating substrate, and may be, for example, a silicon substrate, a glass substrate, a plastic substrate, or the like.

Each of the first substrate BS1 and the second substrate BS2 includes a display area DA and a non-display area NA. The display area DA is an area in which an image is visually recognized, and the non-display area NA is an area in which the image is not visually recognized. The area defined by the display area DA is surrounded by the area defining the non-display area NA.

The display area DA includes a plurality of gate lines GL which extend substantially parallel to one another along a first direction (e.g., a row direction), a plurality of data lines DL which extend substantially parallel to one another along a second direction (e.g., a column direction) perpendicular to and intersecting with the first direction of the gate lines, and a plurality of pixels PX formed in a region in which the gate lines GL and data lines DL intersect with one another. The plurality of pixels PX may be arranged in the row direction and the column direction and may have a substantially matrix shape.

Each pixel PX may uniquely display one primary color so as to achieve the color display. Examples of the primary colors may include, red, green and blue, but is not limited thereto.

The non-display area NA may be a light-shielding area. A driving unit (not illustrated) which provides gate drive signals, data drive signals and the like to the pixels PX of the display area DA may be disposed in the non-display area NA of the first substrate BS1. The gate lines GL and the data lines DL may extend from the display area DA to the non-display area NA and may be electrically connected the driving unit (not illustrated).

An alignment film (not illustrated) may be disposed on an upper surface of the first substrate BS1. A liquid crystal layer 300 may be interposed between the alignment film and the second substrate BS2. The liquid crystal layer 300 may include liquid crystal molecules having a negative dielectric anisotropy, and may also include liquid crystal molecules having a positive dielectric anisotropy, without being limited thereto.

As used herein, the row direction (the horizontal direction) of the liquid crystal display device 10 is referred to as a first direction X, and the column direction (i.e. the vertical direction) will be referred to as a second direction Y. As illustrated in FIGS. 1 and 2, the liquid crystal display device 10 may be a curved liquid crystal display device which is bent along a plane defined by the first direction X. The exemplary embodiment of the curved liquid crystal display device is represented as a flat panel type liquid crystal display device in the following cross-sectional views for convenience and ease of explanation.

Figure 3:
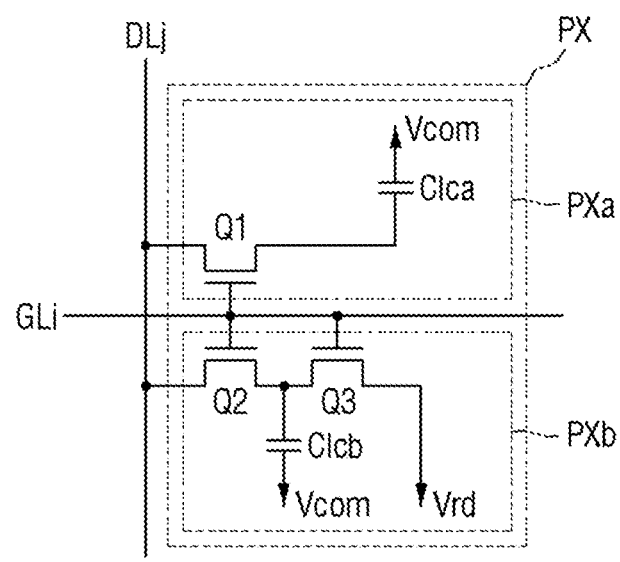
FIG. 3 is an equivalent circuit diagram of a pixel (PX) of the exemplary liquid crystal display in FIG. 2.

FIG. 3 is an equivalent circuit diagram of a pixel of FIG. 2.

Referring to FIG. 3, an arbitrary pixel PX is connected to a corresponding gate line GLi, a data line DLj and a reference voltage line (not illustrated). Here, i and j are integers greater than 0. The pixel PX may be provided with a data signal and a reference voltage Vrd is then provided from the data line DLj and the reference voltage line in response to the gate signal provided through the gate line GLi. The reference voltage Vrd, for example, may be a constant voltage such as a common voltage Vcom, or may be a voltage having the same polarity as the data voltage with respect to the common voltage Vcom.

The pixel PX includes a first switching element Q1, a second switching element Q2, a third switching element Q3, a first liquid crystal capacitor Clca and a second liquid crystal capacitor Clcb. The first and second liquid crystal capacitors Clca, Clcb may be configured to include a pixel electrode and the common electrode to which the common voltage Vcom is applied as two terminals, and to include a liquid crystal layer interposed therebetween as a dielectric. In some exemplary embodiments, the pixel may further include a sustain capacitor.

The first to third switching elements Q1, Q2, Q3 may be three-terminal elements. A control terminal of the first switching element Q1 is connected to the gate line GLi, an input terminal thereof is connected to the data line DLj, and an output terminal thereof may be connected to the first liquid crystal capacitor Clca. Further, a control terminal of the second switching element Q2 is connected to the gate line GLi, an input terminal thereof is connected to the data line DLj, and an output terminal thereof may be connected to the second liquid crystal capacitor Clcb. Further, a control terminal of the third switching element Q3 is connected to the gate line GLi, an input terminal thereof is connected to an output terminal of the second switching element Q2, and an output terminal thereof may be connected to a reference voltage line (not illustrated).

Terminals included in the first to third switching elements Q1, Q2, Q3 and the liquid crystal capacitors Clca, Clcb will be described in more detail later.

Hereinafter, the operation of the pixel PX in a frame interval will be described.

First, when the gate signal is applied to the gate line GLi, the first switching element Q1, the second switching element Q2 and the third switching element Q3 of the pixel PX connected thereto are turned on.

Thus, the data voltage supplied from the data line DLj is applied to a first sub-pixel electrode as one electrode of the first liquid crystal capacitor Clca through the first switching element Q1 that is turned on. In this case, the first liquid crystal capacitor Clca may be charged by a difference between the data voltage and the common voltage Vcom. The first liquid crystal capacitor Clca is charged with a relatively large voltage as compared to a second liquid crystal capacitor Clcb to control the liquid crystal. A pixel region defined by the first liquid crystal capacitor Clca will be referred to as a first sub-pixel PXa or a high-pixel.

At the same time, the second and third switching elements Q2, Q3 which are turned on, electrically connect an input terminal of the second switching element Q2 with an output terminal of the third switching element Q3. At this time, the data voltage supplied from the data line DLj is applied to the input terminal of the second switching element Q2, and the reference voltage Vrd having the magnitude smaller than the magnitude (absolute value) of the data voltage is applied the output terminal of the third switching element Q3, and thus, a predetermined voltage having a value between the data voltage and the reference voltage Vrd is applied to the second sub-pixel electrode which is an electrode of the second liquid crystal capacitor Clcb, by the voltage drop. Therefore, the second liquid crystal capacitor Clcb is charged with a voltage by a difference between a predetermined voltage smaller than the data voltage and the common voltage Vcom, and the second liquid crystal capacitor Clcb is charged with a relatively small voltage as compared to the first liquid crystal capacitor Clca to control the liquid crystal. A pixel region defined by the second liquid crystal capacitor Clcb will be referred to as a second sub-pixel pixel PXb or a low-pixel.

In the case of the high-pixel charged with the relatively high voltage, side visibility is vulnerable in a low gradation in which the liquid crystal is vertically aligned, and in the case of the low-pixel charged with the relatively low voltage, the side visibility is vulnerable in an intermediate gradation and a high gradation in which the liquid crystal approaches a horizontal alignment. That is, the charging voltages of the two liquid crystal capacitors Clca, Clcb represent gamma curves different from each other, and the gamma curve of one pixel voltage recognized by a viewer becomes a curve obtained by synthesizing them. The synthetic gamma curve from the front is set to coincide with the front reference gamma curve determined to be most adaptable, and the synthetic gamma curve from the side surface is set to be in maximally close proximity to the front reference gamma curve. By converting the image data in this way, it is possible to further improve the side visibility.

Hereinafter, the components forming the pixel and their arrangement will be described in further detail.

Figure 4:
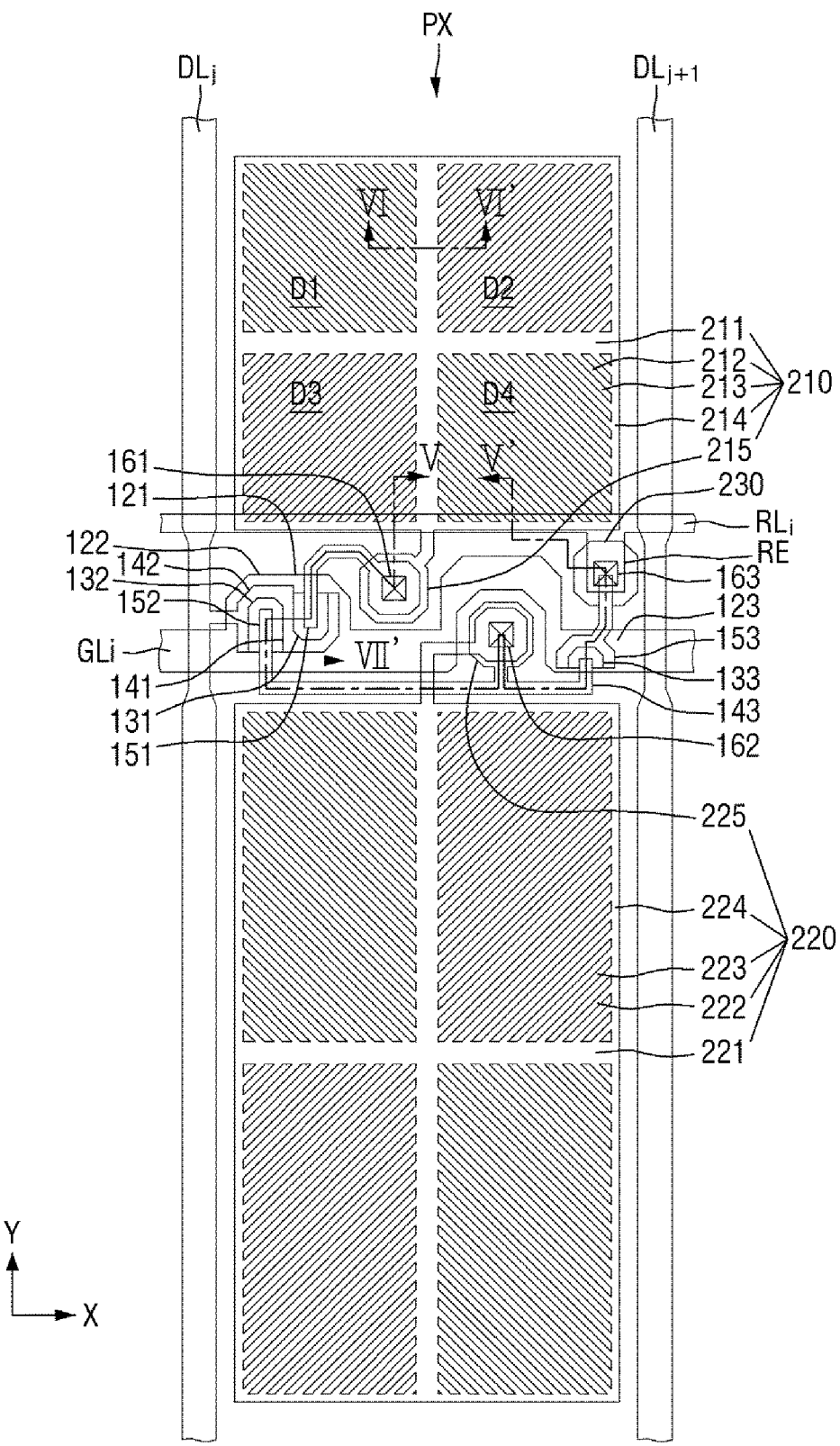
FIG. 4 is an enlarged plan view of a pixel of the exemplary liquid crystal display in FIG. 2.
Figure 5:
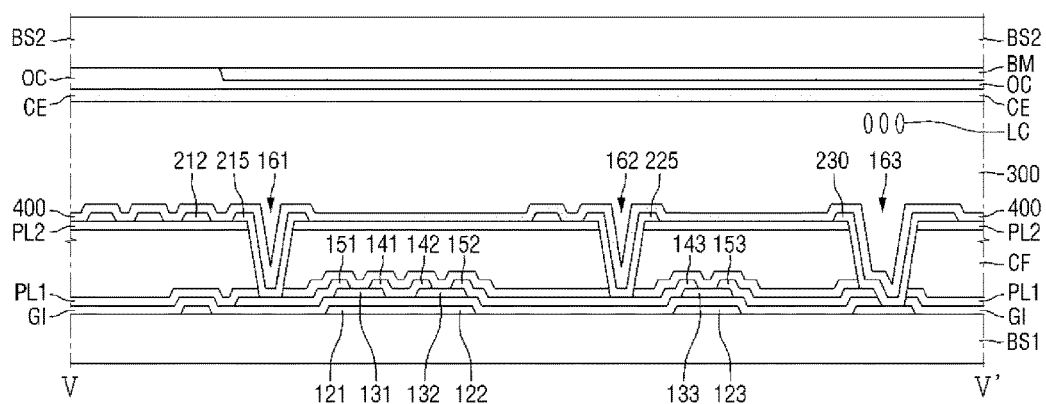
FIG. 5 is a cross-sectional view taken along line V-V' of the exemplary liquid crystal display in FIG. 4.

FIG. 4 is an enlarged plan view of a pixel PX of the exemplary of the liquid crystal display device in FIG. 2. FIG. 5 is a cross-sectional view taken along the line V-V' of FIG. 4.

Referring to FIGS. 4 and 5, the liquid crystal display device includes a first substrate BS1, a second substrate BS2 facing the first substrate BS1 and spaced apart from the first substrate BS1, and a liquid crystal layer 300 interposed between the first substrate BS1 and the second substrate BS2. The first and second substrates BS1, BS2 are transparent or opaque insulating substrates, and may be, for example, a silicon substrate, a glass substrate, a plastic substrate or the like.

The gate line GLi extending along approximately the first direction X is disposed on the first substrate BS1. The gate signal is applied to the gate line GLi to turn on the switching element of a pixel PX connected thereto.

The first gate electrode 121 and the second gate electrode 122 are formed to protrude from the gate line GLi, and the first gate electrode 121 and the second gate electrode 122 may be formed integrally without a physical boundary. Specifically, the first gate electrode 121 and the second gate electrode 122 protrudes downward from the gate line GLi, and the first gate electrode 121 may be disposed on the right side of the second gate electrode 122. Further, the third gate electrode 123 is formed in a region which is superimposed with the extended gate line GLi. That is, the first to third gate electrodes 121, 122, 123 may be physically connected to the same gate line GLi, and the same gate signal may be applied to each of them.

The reference voltage line RLi is formed on the same layer as the gate line GLi and extends substantially parallel to the gate line GLi. As described above, the reference voltage line RLi provides a reference voltage, and is connected to the high-pixel and the same data line DLj. However, it is possible to achieve a low-pixel to which a relatively lower voltage is applied as compared to the high-pixel.

The reference voltage line RLi may include a reference voltage electrode RE, a sustain electrode (not illustrated) and a sustain electrode line (not illustrated). The reference voltage electrode RE protrudes downward from the reference voltage line RLi to have a wide surface, thereby being able to provide a space which can stably come into contact with the third drain electrode 153.

Although it is not illustrated in the drawings, the sustain electrode protrudes downward from the reference voltage line RLi and may be formed on the surface which is superimposed with the first protruding electrode section 215. The sustain electrode may form a sustain condenser with a first drain electrode 151 formed by being superimposed in the upper part and a plurality of protective layers formed therebetween.

In addition, the sustain electrode line (not illustrated) may have a shape which protrudes from the reference voltage line RLi, is partially superimposed with the first sub-pixel electrode 210, and surrounds the outline of the first sub-pixel electrode 210. In some embodiments, the sustain electrode and/or the sustain electrode line may be omitted and their shapes and arrangements may be variously modified.

On the top of the gate line GLi and the reference voltage line RLi, a gate insulating film GI is arranged over the whole upper surface of the first substrate BS1. The gate insulating film GI is made of an insulating material, and may electrically insulate a layer located above and a layer below the gate insulating film GI. Examples of the material forming the gate insulating film GI may include silicon nitride (SiNx), silicon oxide (SiOx), silicon oxynitride (SiOxNy) or silicon nitride oxide (SiNxOy).

The first to third semiconductor layers 131, 132, 133 are disposed on the gate insulating film GI. Each of the first to third semiconductor layers 131, 132, 133 is formed in a region overlapped with the first to third gate electrodes 121, 122, 123, respectively in this order. The first to third semiconductor layers 131, 132, 133 may perform the role of a channel of a thin film transistor.

A plurality of data lines DLj, DLj+1, the first to third source electrodes 141, 142, 143, and the first to third drain electrode 151, 152, 153 are formed on the gate insulating film GI and the first to third semiconductor layers 131, 132, 133.

The plurality of data lines DLj, DLj+1 extends along approximately the second direction Y to intersect with the gate line GLi. The data signal is applied to the data line DLj to charge the pixel electrodes 210, 220 connected thereto with the data voltage.

Each of the first to third source electrodes 141, 142, 143 and the first to third drain electrodes 151, 152, 153 is formed in a region which is at least partially superimposed with the first to third semiconductor layers 131, 132, 133. An ohmic contact layer (not shown) may be further disposed between a source/drain electrode and the semiconductor layer.

The first source electrode 141 and the second source electrode 142 which are interconnected without a physical boundary may be formed to protrude from the data line DLj in the direction of the first and second gate electrodes 121, 122. Each of the first and second source electrodes 141, 142 may have a shape that is bent in a "U" shape. (The third source electrode 143 will be described later.)

The first drain electrode 151 may be formed on the first gate electrode 121 and the first semiconductor layer 131 so as to be spaced apart from the first source electrode 141. Similarly, the second drain electrode 152 is formed on the second gate electrode 122 and the second semiconductor layer 132 so as to be spaced apart from the second source electrode 142. Each of the first and second drain electrodes 151, 152 may be electrically connected to the first sub-pixel electrode 210 and the second sub-pixel electrode 220 through first and second contact holes 161, 162.

Meanwhile, the third source electrode 143 is disposed on the third gate electrode 123 and the third semiconductor layer 133. The third source electrode 143 is physically connected to the second drain electrode 152. The third drain electrode 153 is formed on the third gate electrode 123 and the third semiconductor layer 133 so as to be spaced apart from the third source electrode 143. Further, the third drain electrode 153 may be electrically connected to the reference voltage electrode RE through the third contact hole 163 and the contact electrode 230.

The gate electrode, the semiconductor layer, the source electrode and the drain electrode form a thin film transistor which is the three-terminal switching element illustrated in FIG. 3.

Specifically, the first gate electrode 121 as a control terminal of the first switching element Q1 is electrically connected to the gate line GLi, and the first source electrode 141 as an input terminal is electrically connected to the data line DLj, and the first drain electrode 151 as an output terminal is electrically connected to the first sub-pixel electrode 210.

The second gate electrode 122 as a control terminal of the second switching element Q2 is electrically connected to the gate line GLi, the second source electrode 142 as an input terminal is electrically connected to the data line DLj, and the second drain electrode 152 as an output terminal is electrically connected to the second sub-pixel electrode 220.

The third gate electrode 123 as a control terminal of the third switching element Q3 is electrically connected to the gate line GLi, the third source electrode 143 as an input terminal is physically connected to the second drain electrode 152, and the third drain electrode 153 as an output terminal is electrically connected to a reference voltage electrode RE.

A protective layer which includes a first protective film PL1, a planarization layer CF and a second protective film PL2 may be disposed over the entire surface of the plurality of data lines DLj, DLj+1 and the first to third switching elements Q1, Q2, Q3. The protective layer may be formed of an organic film and/or an inorganic film, and may also have a single layer or double layer structure.

The first protective film PL1 may be an inorganic insulating material such as silicon nitride or silicon oxide. The first protective film PL1 prevents the wiring and electrodes formed on the lower part from coming into direct contact with the organic material.

A planarization layer CF made of an organic material may be disposed on the first protective film PL1. The planarization layer CF is applied over the entire upper surface of the first substrate BS1 to make uniform the height of the plurality of components stacked on the first substrate BS1. In some embodiments, a color filter (not shown) is disposed on the first protective film, the planarization layer is disposed on the color filter, or the planarization layer CF itself may include a color filter. The color filter may be disposed between the plurality of adjacent data lines DLj, DLj+1. The color filter may selectively transmit light of a specific wavelength band, and different color filters which transmit light of different wavelength bands for each pixel may be disposed.

The second protective film PL2 may be disposed on the planarization layer CF. The second protective film PL2 prevents the lifting-up of the planarization layer and the color filter, and suppresses the contamination of the liquid crystal layer due to organic material such as a solvent introduced from the planarization layer and the color filter, thereby being able to prevent a failure such as afterimage that may be caused when starting up the screen.

Meanwhile, a contact hole may be defined in the first protective film PL1, the planarization layer CF and the second protective film PL2 so that the first to third drain electrode 151, 152, 153 and the reference voltage electrode RE are at least partially exposed. The first drain electrode 151 is electrically connected to the first sub-pixel electrode 210 through the first contact hole 161, the second drain electrode 152 is electrically connected to the second sub-pixel electrode 220 through the second contact hole 162, and the third drain electrode 153 is electrically connected to the reference voltage electrode RE through a third contact hole 163 and a contact electrode 230 formed in the third contact hole 163.

The pixel electrodes 210, 220 and the contact electrode 230 are formed in a region exposed by the second protective film PL2 and the first to third contact holes 161, 162, 163. The contact electrode 230 has a function of electrically connecting the reference voltage electrode RE exposed through the third contact hole 163 with the third drain electrode 153. The contact electrode 230 may be formed of the same material as the pixel electrodes 210, 220 using an integrated process which will be described later.

The pixel electrodes 210, 220 form an electric field with the common electrode CE formed on the second substrate BS2, and may control the alignment direction of the liquid crystal molecules LC of the liquid crystal layer 300 interposed therebetween. The pixel electrodes 210, 220 may be a transparent electrode. Examples of the material which forms the transparent electrodes may include, but not limited to, indium tin oxide ("ITO"), indium zinc oxide ("IZO") or the like.

The pixel electrodes 210, 220 include a first sub-pixel electrode 210 and a second sub-pixel electrode 220 that are spaced apart from each other. As described above, the first sub-pixel electrode 210 is electrically connected to the first drain electrode 151 as an output terminal of the first switching element Q1, and the second sub-pixel pixel electrode 220 may be electrically connected to the second drain electrode 152 as an output terminal of the second switching element Q2.

The first sub-pixel electrode 210 generally has a substantially rectangular shape, and may include a first protruding electrode section 215 which protrudes downward. In addition, the first sub-pixel electrodes 210 may be an electrode having a slit pattern.

Specifically, the slit pattern of the first sub-pixel electrode 210 may include a first stem electrode section 211, a plurality of first branch electrode sections 212 which is formed by extending from the first stem electrode section 211, a first slit section 213 which is disposed between the plurality of first branch electrode sections 212, and a first connecting electrode section 214 which is formed in a frame portion of the first sub-pixel electrode 210 to connect the plurality of first electrode sections 212 with one another.

The first stem electrode section 211 may be formed in a substantially cross (+) shape, and the first branch electrode section 212 may radially extend in a direction tilted from cross-shaped first stem electrode section 211, e.g. in a direction of approximately 45°. Accordingly, the first sub-pixel electrode 210 may have four domains region D1, D2, D3, D4 which are divided by the first stem electrode section 211 and in which the first branch electrode section 212 and the first slit section 213 are different from each other in directivity. The domain region D1, D2, D3, D4 serves as a director of the liquid crystal molecules LC to form a domain which makes the alignment directions of the liquid crystal molecules LC different from each other during driving. Thus, as the liquid crystal control improves, the viewing angle increases, the texture decreases, and additionally, the transmittance and the response speed are improved.

At least some of the first electrode sections 212 which extend radially may be connected to one another through the first connecting electrode section 214 that connects the distal ends of the first branch electrode section 212 with each other. Also, a first protruding electrode section 215 is formed below the first sub-pixel electrode 210 and is electrically connected to the first drain electrode 151 through the first contact hole 161 as described above. In this case, the first sub-pixel electrode 210 may correspond to the high-pixel.

The second sub-pixel electrode 220 may include a second protruding electrode section 225, a second stem electrode section 221, a second branch electrode section 222, a second slit section 223 and a second connecting electrode section 224, and generally has substantially the same shape and configuration as those of the first sub-pixel electrode 210. However, the second sub-pixel pixel electrodes 220 may have a rectangular shape in which a vertical length is longer than a horizontal length. An area ratio on the plane between the first sub-pixel electrode 210 and the second sub-pixel electrode 220 may be approximately 1:2 or more and 1:10 or less.

The second sub-pixel electrode 220 is electrically connected to the second drain electrode 152 through the second contact hole 162, and may correspond to a low-pixel to which a voltage lower than the first sub-pixel electrode 210 is applied.

The shapes of the first and second sub-pixel electrodes 210, 220 are only an example, and in some embodiments, the first and second sub-pixel electrodes may also be disposed in the form of being bent to the gate line and the data line, and may also be deformed to conform to the various shapes of the branch electrode section and the slit section.

In some embodiments, a shield electrode (not shown) may be disposed in a region which is superimposed with the plurality of data lines DLj, DLj+1. The shield electrode (not shown) is formed on top of the data line DLj, DLj+1 to serve to prevent the inter-electrode interference problem which may be caused by a sudden change in polarity of the data voltage, or a problem in which the liquid crystal molecules located on the top of the data line DLj, DLj+1 are directly affected by the data voltage. For example, the same voltage as the reference voltage may be applied to the shield electrode (not illustrated) or the shield electrode may be in a floating state. The shield electrode and the reference voltage line may also be in a state of being electrically connected to each other.

Meanwhile, an alignment film 400 may be disposed on the sub-pixel electrodes 210, 220, the contact electrode 230, and the second protective film PL2. Also, a photo-curable layer 550 (see FIG. 6) may be formed on the alignment film 400.

Next, the second substrate BS2 will be described. The second substrate BS2 may be an upper substrate as positioned relative to the first substrate BS1. A light shielding member BM, an overcoat layer OC and a common electrode CE may be disposed on the second substrate BS2.

The light shielding member BM may be disposed at the boundary between the plurality of color filters. More specifically, the light shielding member may be disposed in a region which is superimposed with a plurality of data lines DLj, DLj+1, the gate line GLi and the first to third switching elements Q1, Q2, Q3 formed on the first substrate BS1. For example, the light-shielding member BM may also be a black matrix. Alternatively, the light shielding member may also be formed on the top of the color filter of the first substrate, unlike the configuration illustrated in the figures.

The overcoat layer OC may act as a planarization layer and may be formed on the second substrate 200 and the light shielding member BM. The common electrode CE may be disposed on the overcoat layer OC. The common voltage is applied to the common electrode CE, and thus, the common electrode may generate an electric field together with the pixel electrodes 210, 220 formed on the first substrate BS1 to control the alignment direction of the liquid crystal molecules LC of the liquid crystal layer 300 interposed therebetween. The common electrode CE may be a transparent electrode, and the common electrode CE may be a pattern-less electrode having no slit pattern, however the common electrode may also have a predetermined pattern without being limited thereto.

A vertical alignment inducing layer 650 may be formed on the common electrode CE. Hereinafter, the alignment film 400, the photo-curable layer 550 and the vertical alignment inducing layer 650 will be described in detail with reference to FIG. 6.

Figure 6:
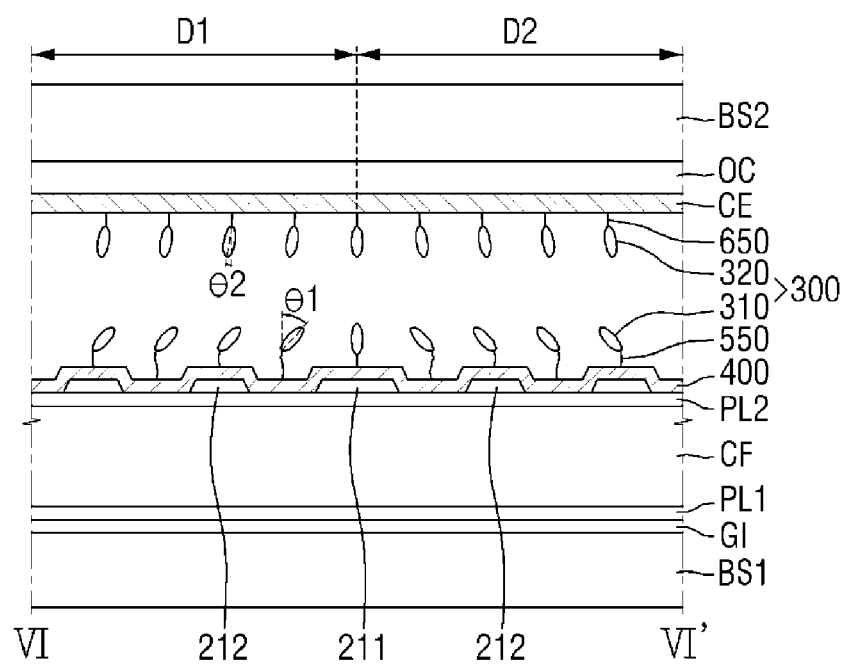
FIG. 6 is a cross-sectional view taken along line VI-VI' of the exemplary liquid crystal display in FIG. 4.

FIG. 6 is a cross-sectional view taken along the line VI-VI' of the exemplary liquid crystal display in FIG. 4. FIG. 6 schematically illustrates the alignment of the liquid crystal molecules in an initial state in which no electric field is applied to the liquid crystal display device.

Referring to FIGS. 4 and 6, the liquid crystal layer 300 includes first liquid crystal molecules 310 adjacent to the surface of the alignment film 400 disposed on the lower substrate including the first substrate BS1, and second liquid crystal molecules 320 adjacent to the surface of the common electrode CE disposed on the upper substrate including the second substrate BS2.

The alignment film 400 is disposed on the second protective film PL2 formed on the first substrate BS1 and the pixel electrodes 210, 220. In an exemplary embodiment, the alignment film 400 may be a vertical alignment type liquid crystal alignment film formed of a polyimide in which an imide group (—CONHCO—) is contained within a repeating unit of a main chain and one or more side chains are connected to the main chain. A portion of the side chains includes at least one vertical alignment group selected from one or more of an alkyl group, hydrocarbon derivatives terminally substituted by an alkyl group, hydrocarbon derivatives terminally substituted by a cycloalkyl group, and hydrocarbon derivatives terminally substituted by aromatic hydrocarbon.

At least a portion of the side chains of the alignment film 400 may further contain a side chain substituted by a polymerization initiator in addition to the vertical alignment group. The polymerization initiator may be a photopolymerization initiator. In this case, the photopolymerization initiator absorbs ultraviolet ("UV") light and is decomposed into radicals, which promote the polymerization reaction.

In exemplary embodiments, the polymerization initiator may include one or more of acetophenone, benzoin, benzophenone, diethoxyacetophenone, phenylketone, thioxanthone, 2-hydroxy-2-methyl-1-phenylpropane-1-on, benzyl dimethyl tar, 4-(2-hydroxyethoxy) phenyl-(2-hydroxy-2-propyl) ketone, 1-hydroxycyclohexyl phenyl ketone, methyl o-benzoyl benzoic acid, 4-phenyl benzophenone, 4-benzoyl-4'-methyl-diphenyl sulfide, (4-benzoyl-benzyl) trimethyl-ammonium chloride, bis (2,4,6-trimethylbenzoyl)-phenyl phosphine oxide, diphenyl (2,4,6-trimethyl benzoyl)-phosphine oxide, 2-hydroxy-2-methylpropionitrile, 2,2'-{azobis (2-methyl-N-[1,1'-bis (hydroxymethyl)-2-hydroxyethyl) propionamide], acrylic acid [(2-methoxy-2-phenyl-2-benzoyl)-ethyl] ester, phenyl 2-acryloyloxy-2-propyl ketone, phenyl 2-methacryloyloxy-2-propyl ketone, 4-isopropyl phenyl, 2-acryloyloxy-2-propyl ketone, 4-chlorophenyl 2-acryloyloxy-2-propyl ketone, 4-dodecyl phenyl 2-acryloyloxy-2-propyl ketone, 4-methoxyphenyl, 2-acryloyloxy-2-propyl ketone, 4-acryloyloxy phenyl 2-hydroxy-2-propyl ketone, 4-methacryloyloxyphenyl 2-hydroxy-2-propyl ketone, 4-(2-acryloyloxyethoxy)-phenyl 2-hydroxy-2-propyl ketone, 4-(2-acryloyloxyethoxy)-phenyl 2-hydroxy-2-propyl ketone, 4-(2-acryloyloxyethoxy)-benzo, 4-(2-acryloyloxy ethylthio)-phenyl 2-hydroxy-2-propyl ketone, 4-N, N'-bis-(2-acryloyloxyethyl)-aminophenyl 2-hydroxy-2-propyl ketone, 4-acryloyloxyphenyl 2-acryloyloxy-2-propyl ketone, 4-methacryloyloxyphenyl 2-methacryloyloxy-2-propyl ketone, 4-(2-acryloyloxyethoxy)-phenyl 2-acryloyloxy-2-propyl ketone, 4-(2-acryloyloxyethoxy)-phenyl 2-acryloyloxy-2-propyl ketone, dibenzylketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acylphosphine, and α-aminoketone. However, the above-mentioned polymerization initiators are not limited thereto.

In addition to the vertical alignment group and the polymerization initiator, at least a portion of the side chain of the alignment film 400 may further contain a side chain substituted by an ion scavenger. The ion scavenger may be a cationic scavenger or an anionic scavenger. The ion scavenger may capture ionic impurities in the liquid crystal layer 300 to improve the voltage maintenance of the liquid crystal display device.

A photo-curable layer 550 may be formed on the top of the alignment film 400. The photo-curable layer 550 may be understood as a layer formed on substantially the entire upper surface of the alignment film 400, despite the illustrated configuration. The photo-curable layer 550 may be formed of a polymer compound in which single molecules including the vertical alignment group and the photo-curable agent are chemically bonded to each other. The photo-curable layer 550 is cured while being aligned along the tilted direction of the liquid crystal molecules. In particular, the first liquid crystal molecules 310 connected to the photo-curable layer 550 may maintain the pre-tilt even in a state in which no electric field is formed. As a result, when an electric field for driving is formed in the liquid crystal display device, the liquid crystal molecules LC are tilted in the pre-tilt direction, and thus, the response speed of the liquid crystal display device can be improved.

The photo-curable agent may be a reactive mesogen ("RM"). The term mesogen refers to a photo cross-linkable low molecular or high-molecular copolymer including a mesogen group having a liquid crystal nature, and which initiates a chemical reaction such as polymerization reaction when absorbing light of a particular wavelength. The reactive mesogen may be, for example, an acrylate, methacrylate, epoxy, oxetane, vinyl-ether, styrene, thioether, thiol, or thiolen group. In addition, the reactive mesogen may be a material of a rod-shaped, banana-shaped, board-shaped or disk-shaped structure.

Meanwhile, the vertical alignment inducing layer 650 may be formed below the common electrode CE. The vertical alignment inducing layer 650 may also be understood by a layer formed on substantially the entire lower surface of the common electrode CE despite the illustrated configuration. The vertical alignment inducing layer is formed from a vertical alignment inducer compound. At one end, the molecules of the vertical alignment inducer include an affinity liquid crystal group having a high affinity with the liquid crystal molecules LC, and at the other end, the molecules of the vertical alignment inducer include a hydrophilic group that has high affinity with the common electrode CE, as compared to the liquid crystal molecules LC.

In an exemplary embodiment, the affinity liquid crystal group may include an alkyl group, a cycloalkyl group, an aryl group, an ester group and an azo group. In an exemplary embodiment, the hydrophilic group may include, but is not limited to, a group capable of hydrogen bonding or which has a high dielectric constant or polarity, such as, for example, a hydroxyl group, an amine group, an amino group, a carboxyl group, a silane group, a siloxane group and a thiol group.

In an exemplary embodiment, the vertical alignment inducer may be a chain-type (i.e. linear) molecule having the structure of Formula 1 below.

[Formula 1]

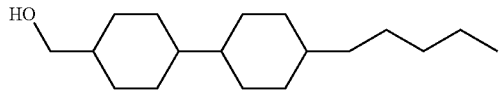

The hydrophilic group of the vertical alignment inducer may be aligned on the surface of the common electrode CE through a hydrogen bond with, for example, a hydroxyl group (—OH) exposed to the surface of the common electrode CE. Meanwhile, since the affinity liquid crystal group has a higher affinity with the liquid crystal molecules LC as compared to the common electrode CE, it can be aligned in the direction of the liquid crystal layer 300. The vertical alignment inducer may be vertically self-aligned on the surface of the common electrode CE through a man power and/or a repulsive force is formed by the vertical alignment inducer with the common electrode CE and the liquid crystal molecules LC. Thus, a vertical alignment inducing layer 650 in which the liquid crystal molecules LC may be aligned may be formed on the upper substrate including the second substrate BS2, without forming a separate alignment film. The vertical alignment inducer may be included, but not limited to, in a proportion from about 10 ppm up to about 30 weight percent (wt %), as compared to the total weight of the liquid crystal composition.

Meanwhile, the alignment of the first liquid crystal molecules 310 formed in the first domain region of D1 is different from the first liquid crystal molecules 310 formed in the second domain region D2 in the liquid crystal alignment direction. For example, the first liquid crystal molecules 310 formed in the first domain region D1 may be aligned to have approximately a first pre-tilt angle θ1, and the first liquid crystal molecules 310 formed in the second domain region D2 may be aligned to have a pre-tilt angle which has the same magnitude as the first pre-tilt angle θ1 but has a direction opposite thereto. In this way, as described above, it is possible to improve the viewing angle and improve the response speed, by forming the domains in which the alignment directions of the liquid crystal molecules are different from each other.

Meanwhile, the second liquid crystal molecules 320 are aligned to have a second pre-tilt angle θ2 and may be vertically aligned as compared to the first liquid crystal molecules 310. In an exemplary embodiment, the second pre-tilt angle θ2 may be from 0° to about 2° or less, and the first pre-tilt angle θ1 may be aligned at an angle of greater than 1° or more than the second pre-tilt angle θ2. As used herein, the first and second pre-tilt angles θ1, θ2 refer to the magnitude of the angle in which the long axes of the first and second liquid crystal molecules 310, 320 are tilted with respect to imaginary normal line of the first and second substrates BS1, BS2. For example, when the liquid crystal molecules are aligned vertically with respect to the surface, the pre-tilt angle of the liquid crystal molecules is 0°.

In an initial state in which no electric field is applied to the liquid crystal display device, the first liquid crystal molecules 310 adjacent to the surface of the lower substrate have the large pre-tilt angle, and the second liquid crystal molecules 320 adjacent to the surface of the upper substrate are substantially vertically aligned. Thus, there is an effect of being able to improve the soil or dark part caused by collision of the alignment directions of the first liquid crystal molecules 310 and the second liquid crystal molecules 320.

In addition, since an alignment film is disposed on top of the lower substrate and the alignment angle of the liquid crystal molecules may be adjusted without forming a separate alignment film on the upper substrate, the process becomes simplified. Further, since there is no need to use, maintain and manage different compositions and/or types of alignment films, there is a reduction in the cost.

Hereinafter, exemplary embodiments of a method of manufacturing the liquid crystal display device according to the present invention will be described.

Figure 7:
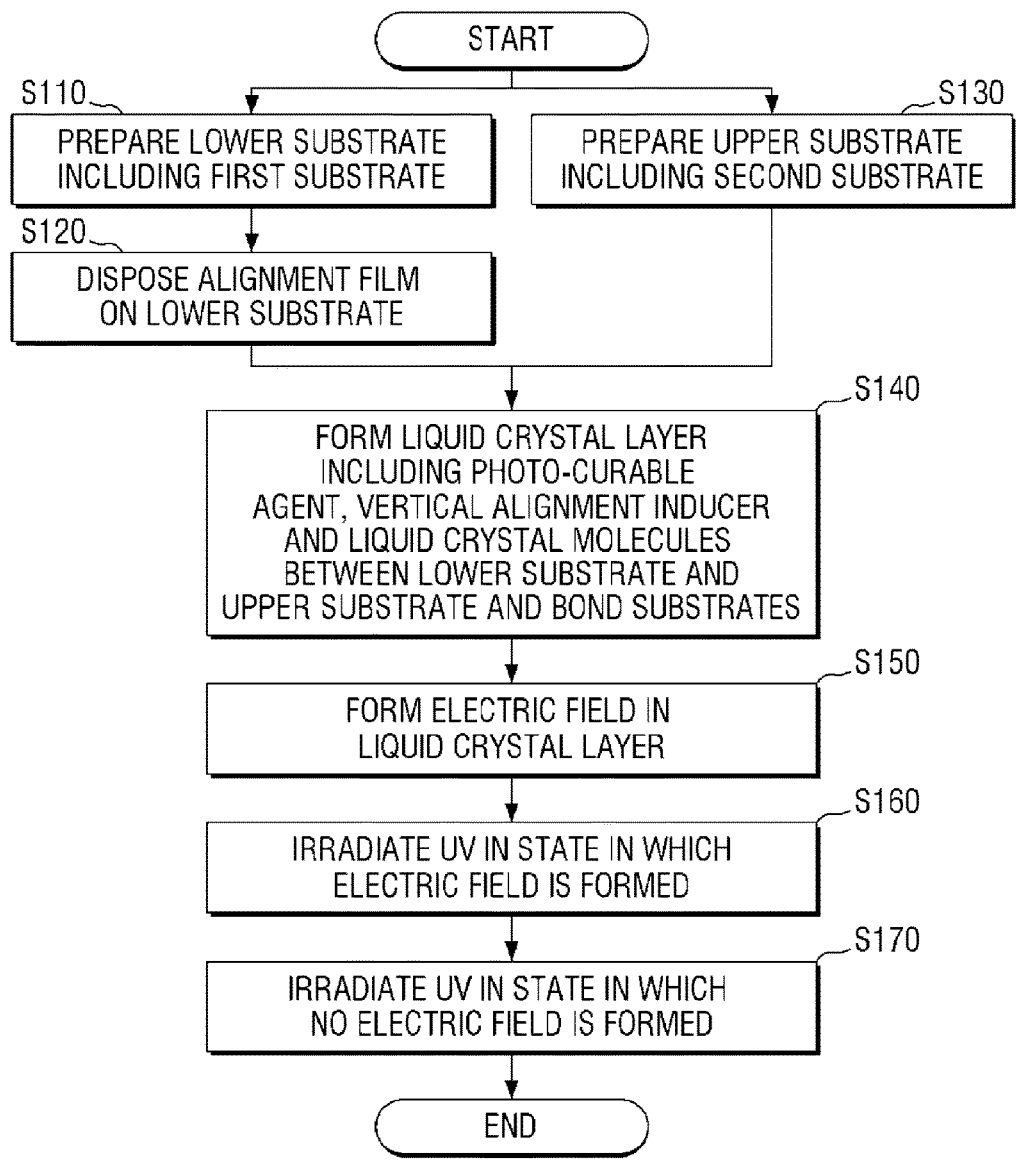
FIG. 7 is a flowchart illustrating an exemplary process for manufacturing the liquid crystal display device according to the present invention.

FIG. 7 is a flowchart illustrating an exemplary embodiment of a process for manufacturing the liquid crystal display device according to the present invention. FIGS. 8 to 14 are cross-sectional views illustrating the individual steps of the manufacturing process of FIG. 7 in a stepwise manner.

Figure 8:
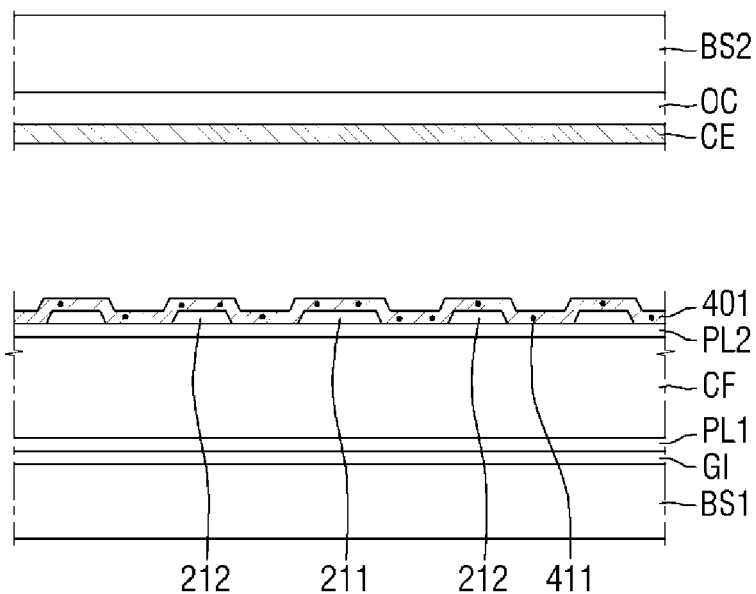
FIGS. 8 to 14 are cross-sectional views illustrating the separate manufacturing process steps of FIG. 7 in a stepwise manner, where

Referring to FIGS. 7 and 8, a lower substrate including the first substrate BS1, and an upper substrate including the second substrate BS2 are prepared (S110, S130). As described previously, the lower substrate includes a gate line (not illustrated), a reference voltage line (not illustrated), a gate insulating film GI, a data line (not illustrated), a gate/source/drain electrode, protective film layers PL1, PL2, a color filter CF and pixel electrodes 211, 212 on the first substrate BS1. The upper substrate includes alight shielding member BM, an overcoat layer OC and a common electrode CE on the second substrate BS2. The alignment film 401 may be disposed on the upper surface of the lower substrate (S120).

The components such as the gate line, the reference voltage line, the data line, the semiconductor layer and the gate/source/drain electrodes included in the lower substrate and the upper substrate may be formed by forming a metal layer on the substrate and by patterning the metal layer. The patterning may use a mask process, and other methods capable of forming the pattern may be used in addition to this method.

The pixel electrodes 211, 212 may be disposed on the top of the lower substrate. The pixel electrodes 211, 212 may be a transparent electrode that is made of indium tin oxide (ITO) and indium zinc oxide (IZO). The pixel electrodes 211, 212 have slit patterns and include the stem electrode section and the branch electrode section as described above. Further, between the branch electrode sections of the pixel electrode 212, a part of the lower substrate may be exposed through the slit section.

The alignment film 401 may be formed by coating or printing the alignment film composition on the upper surface of the lower substrate. As described previously, the alignment film 401 is a polyimide which contains the imide group within the repeating unit of the main chain. The polyimide has a vertical alignment group (not illustrated), a polymerization initiator 411 and/or an ion scavenger (not illustrated) in a side chain. Since the alignment film 401 may have substantially the same configuration as the alignment film 400 of FIG. 6, a detailed description thereof will not be provided.

The common electrode CE may be disposed on the top of the upper substrate. The common electrode CE may be a transparent electrode like the pixel electrodes 211, 212. In addition, the common electrode CE may be a pattern-less electrode having no slit pattern, but may have a predetermined pattern, without being limited thereto.

Figure 9:
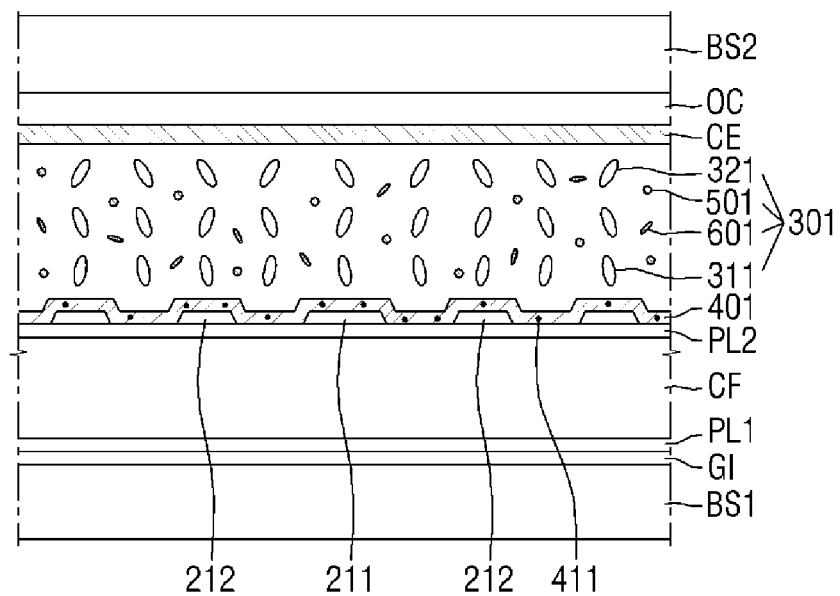

Next, referring to FIGS. 7 and 9, a liquid crystal layer 301, which includes photo-curable agent 501, a vertical alignment inducer 601 and liquid crystal molecules LC having negative dielectric anisotropy, is interposed between the lower substrate and the upper substrate (S140). The liquid crystal layer 301 may be formed through a liquid crystal dropping process and both substrates can be bonded to each other, or alternatively, a liquid crystal injection process may be used after bonding both the substrates.

The liquid crystal molecules LC in the liquid crystal layer 301 include first liquid crystal molecules 311 adjacent to the surface of the alignment film 401, and second liquid crystal molecules 321 adjacent to the surface of the common electrode CE. In the initial state in which no electric field is formed, the first liquid crystal molecules 311 may be substantially vertically aligned by the vertical alignment group of the alignment film 401. Here, the expression "substantially vertically aligned" means that the first liquid crystal molecules 311 are aligned in the range from about 88° to about 90° or less with respect to the first substrate BS1.

After bonding, in order to improve the spreading characteristics and uniformity of the liquid crystal molecules LC, an annealing process may be performed.

Figure 10A:
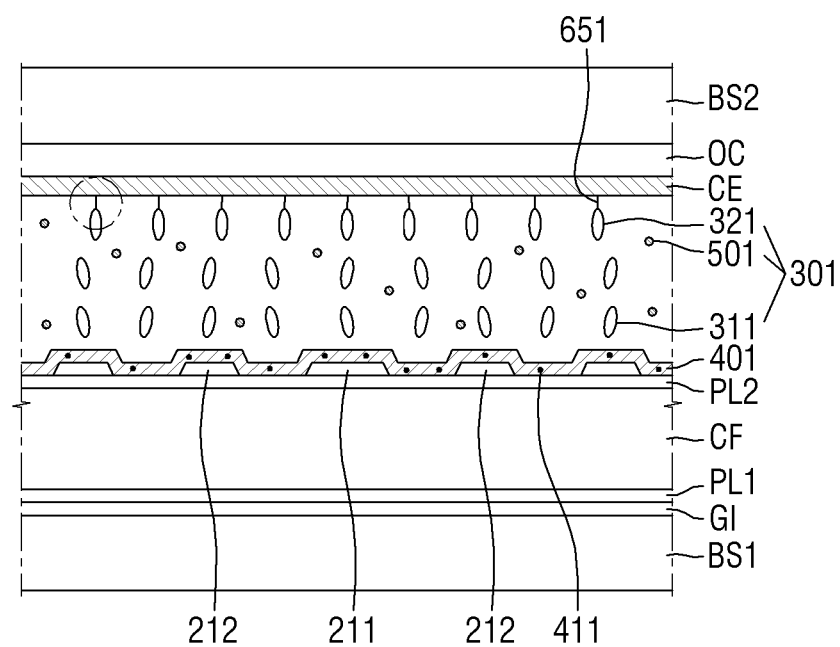
FIG. 10(B) is an enlarged view of the circled portion of FIG. 10(A)
Figure 10B:
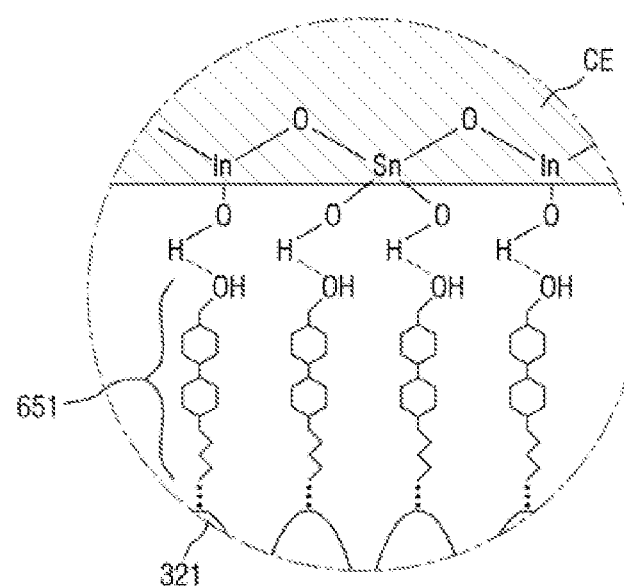

Referring to FIGS. 10(A) and 10(B), in which FIG. 10(B) is an enlarged view of the circled portion of FIG. 10(A), after forming the liquid crystal layer 301 including the vertical alignment inducer 601, the vertical alignment inducing layer 651 may be formed on the surface of the common electrode CE. As described above, one end of the vertical alignment inducer 601 having a hydrophilic group may be aligned in the direction of the common electrode CE through a hydrogen bond between a hydroxyl group exposed to the surface of the common electrode CE. Meanwhile, since a functional group capable of performing the hydrogen bonding is not present on the surface of the alignment film 401, the vertical alignment inducer 601 has high chemical selectivity to the common electrode CE, as compared to the alignment film 401. Therefore, it is possible to selectively induce the formation of vertical alignment inducing layer 651 only on the surface of the common electrode CE.

In particular, when performing the liquid crystal dropping process, after dropping the liquid crystal composition including the vertical alignment inducer 601 on the upper substrate on which the common electrode CE is formed, the lower substrate and the upper substrate are bonded to each other. At this time, after a sufficient amount of time to predominantly form the vertical alignment inducing layer 651 on the surface of the common electrode CE of the upper substrate onto which the liquid crystal composition is dropped, both substrates are bonded to physically further increase the selectivity of the vertical alignment inducing layer 651.

Meanwhile, the other end of the vertical alignment inducer 601 having an affinity liquid crystal group is aligned in the direction of the liquid crystal layer 301. The vertical alignment inducer 601 therefore may be self-aligned vertically with respect to the surface of the common electrode CE. Thus, the second liquid crystal molecules 321 adjacent to the affinity liquid crystal group of the vertical alignment inducer 601 may be aligned substantially vertically with respect to the surface of the common electrode CE.

Figure 11:
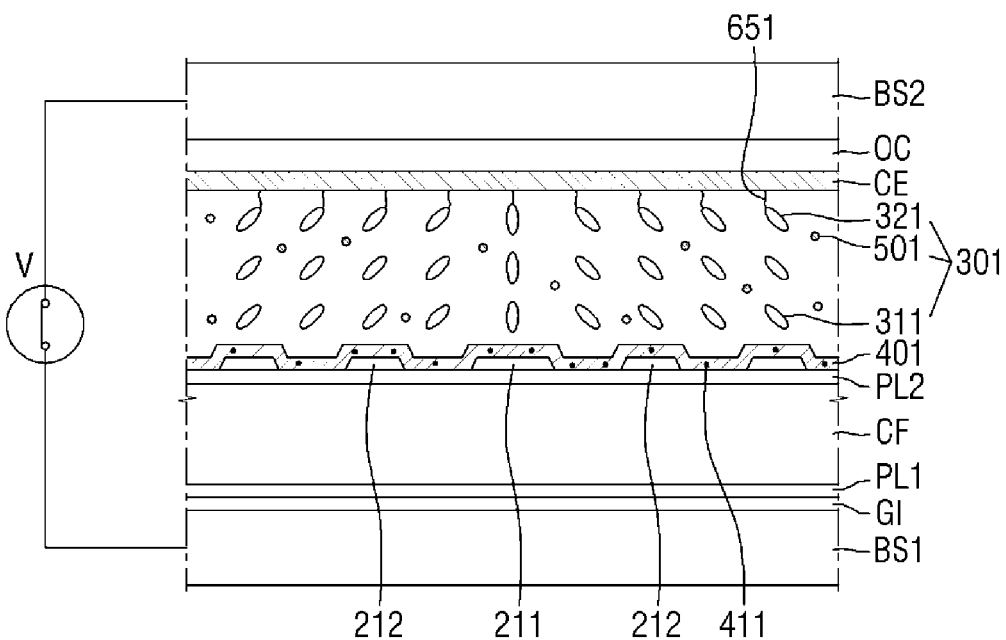

Next, referring to FIGS. 7 and 11, by forming an electric field between the lower substrate and the upper substrate of the liquid crystal display device, the liquid crystal molecules LC may be obliquely aligned in a direction perpendicular to the electric field formed between the common electrode CE and the pixel electrodes 211, 212 (S150).

Figure 12:
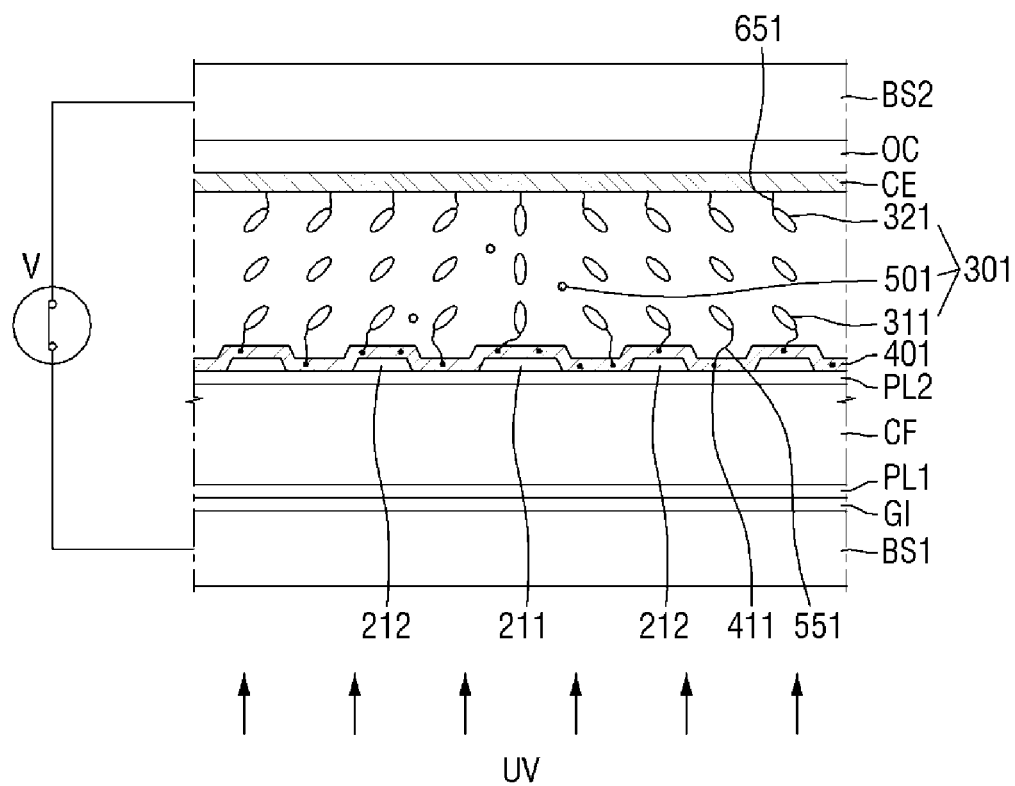

Next, referring to FIGS. 7 and 12, by irradiating the ultraviolet (UV) light at the same time in which the electric field is formed (i.e. electric field is present) and by initiating photopolymerization reaction of the photo-curable agent 501 by the polymerization initiator 411 included in the alignment film 401, the photo-curable layer 551 can be formed (S160). The photo-curable agent 501 may be, for example, a reactive mesogen. The photo-curable layer 551 may be a polymer compound in which single molecules containing the vertical alignment group and the photo-curable agent 501 are chemically bonded to each other.

Specifically, the liquid crystal molecules LC having a negative dielectric anisotropy are obliquely aligned by an electric field, and the vertical alignment group of the alignment film 401 and the polymerization initiator 411 are arranged in the same direction as the first liquid crystal molecules 311, by the arrangement of the liquid crystal molecules LC, in particular, the first liquid crystal molecules 311. At this time, while double bonding of the photoreactive groups of the photo-curable agent 501 is initiated by the polymerization initiator 411, the photoreactive groups form crosslinks with the surrounding photoreactor portion.

At this time, the content of the photo-curable agent 501 in the liquid crystal layer 301 gradually decreases, since the reduced photo-curable agent 501 is being used to form the photo-curable layer 551.

Meanwhile, since the vertical alignment inducing layer 651 does not contain the polymerization initiator 411, the polymerization reaction does not proceed in the vertical alignment inducing layer 651.

Figure 13:
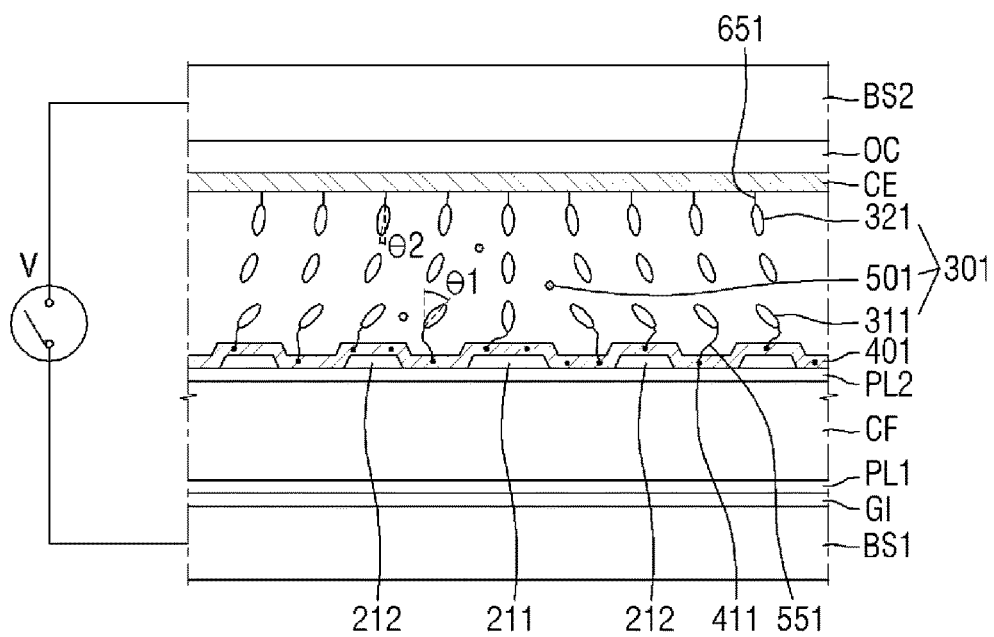

FIG. 13 is a diagram illustrating that the alignment direction of the first liquid crystal molecules 311 are fixed or stabilized by the pre-tilt photo-curable layer 551. That is, the first liquid crystal molecules 311 have a first pre-tilt angle $\theta 1$ even when no electric field is present. Meanwhile, the tilted alignment of the second liquid crystal molecules 321 is not maintained when the electric field is absent and is substantially vertically aligned to have a second pre-tilt angle $\theta 2$ smaller than the first pre-tilt angle $\theta 1$. The reason is that, as described above in FIG. 10, the vertical alignment inducer 601 is self-aligned vertically with respect to the surface of the common electrode CE and the vertical alignment inducing layer 651 formed by the vertical alignment inducer is not cured by the photo-curable agent 501, and the vertical alignment inducing layer 651 induces the vertical alignment of the second liquid crystal molecules 321. Thus, it is possible to differently control the pre-tilt angles of the first liquid crystal molecules 311 and the second liquid crystal molecules 321. And, since it is not necessary to form an alignment film on the upper substrate, there is an advantage of being able to reduce the manufacturing cost and simplify the process.

Figure 14:
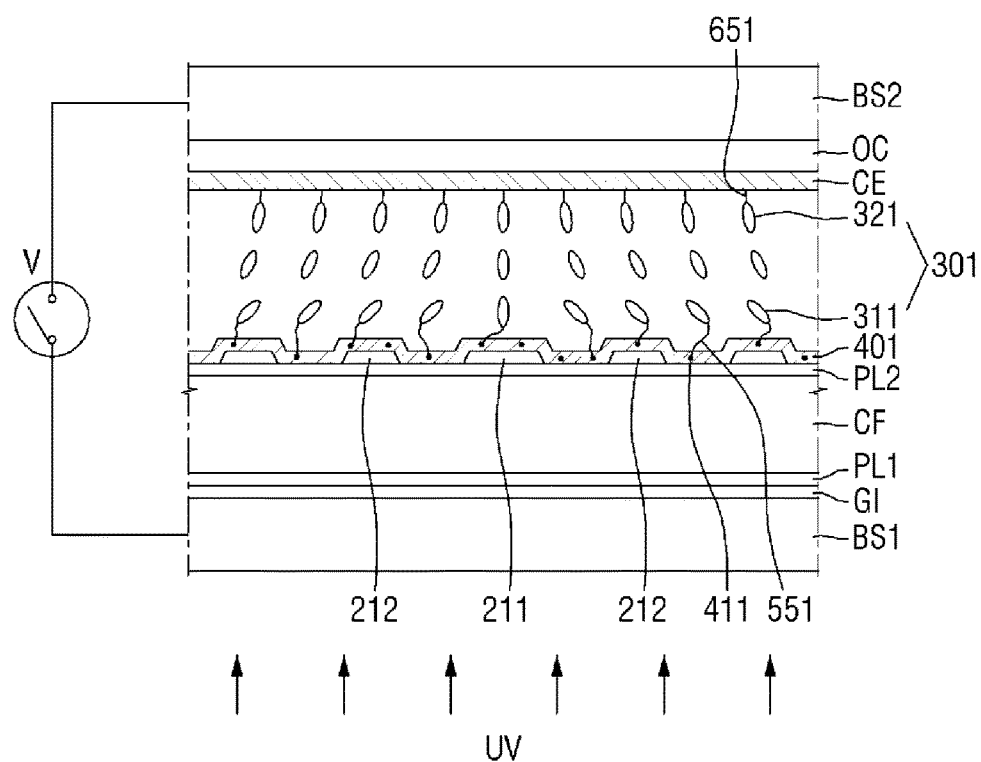

Referring to FIGS. 7 and 14, ultraviolet light is irradiated again but is done so in a state in which no electric field is formed (i.e. electric field is absent) in order to remove any remaining photo-curable agent 501 (S170). By removing the residual photo-curable agent 501 remaining in the liquid crystal layer 301, it is possible to prevent afterimage or dirt failure that may occur in the liquid crystal display device. Thereafter, although it is not illustrated, it is possible to manufacture a curved liquid crystal display device through a process which encompasses bending both ends of the liquid crystal display device.

Hereinafter, another exemplary embodiment of a process of manufacturing process a liquid crystal display device according to the present invention will be described.

Figure 15:
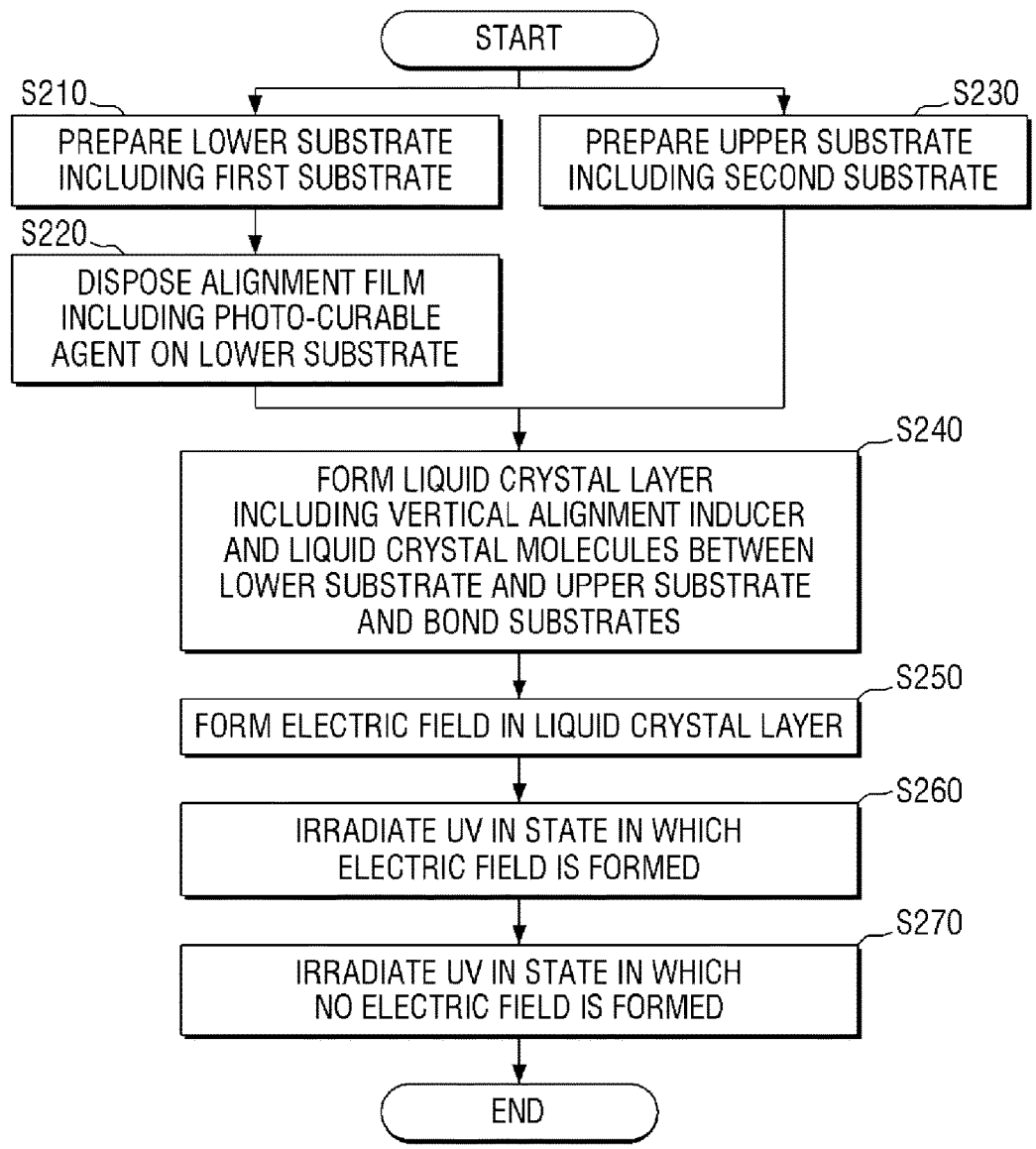
FIG. 15 is a flowchart illustrating another exemplary process of manufacturing the liquid crystal display device according to the present invention.

FIG. 15 is a flowchart illustrating an exemplary embodiment of the manufacturing process steps for the liquid crystal display device according to the present invention. FIGS. 16 to 22 are cross-sectional views illustrating the separate manufacturing process steps of FIG. 15 in a stepwise manner. However, in order not to obscure the essence of the invention, additional methods of manufacturing the liquid crystal display using substantially the same or similar configurations as the method of manufacturing the liquid crystal display device will not be described, but will instead be clearly understood by those skilled in the art in view of the accompanying drawings.

Figure 16:
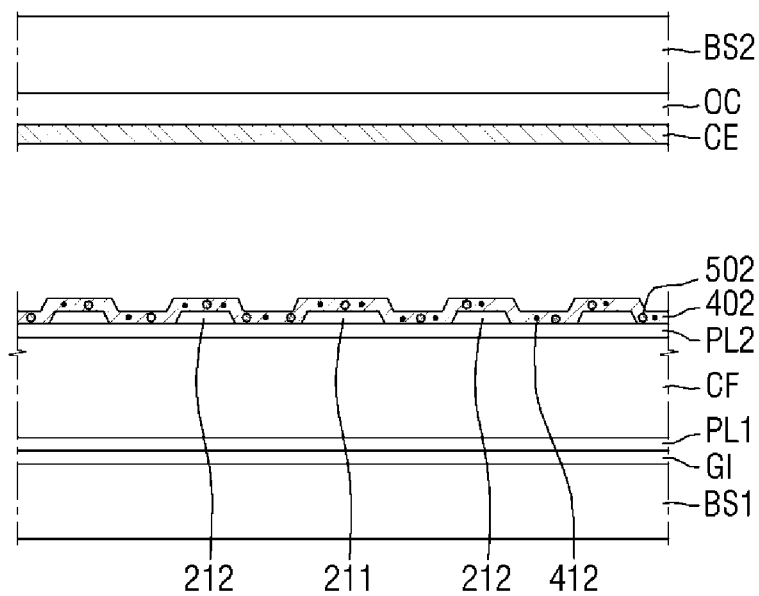
FIGS. 16 to 22 are cross-sectional views illustrating the separate manufacturing processes of FIG. 15 in a stepwise manner, where

Referring to FIGS. 15 and 16, a lower substrate including the first substrate BS1, and an upper substrate including the second substrate BS2 are prepared. (S210, S230) An alignment film 402 may be disposed on the upper surface of the lower substrate (S220).

The alignment film 402 may be formed by coating or printing an alignment film composition on the upper surface of the lower substrate. As described previously, the alignment film 402 includes a polyimide having a main chain including an imide group within the repeating unit of the main chain, and one or more side chain connected to the main chain. The side chain may include a vertical alignment group (not shown), the polymerization initiator 412 and/or an ion scavenger (not shown).

In addition, this embodiment is different from the previously described manufacturing method of the present invention in that the alignment film 402 further contains a photo-curable agent 502. The photo-curable agent 502 may also be connected to the side chain of polyimide forming the alignment film 402, and may also be included in the alignment film 402 composition.

Figure 17:
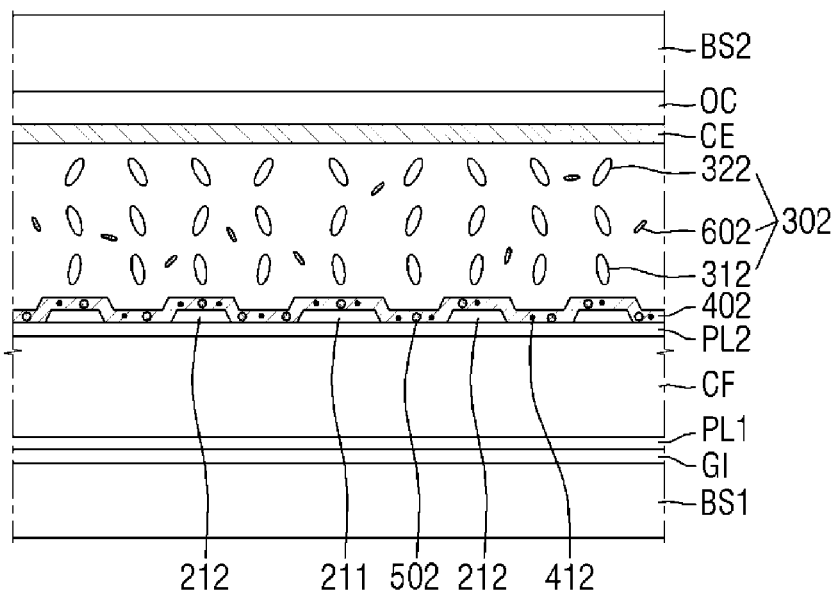

Next, referring to FIGS. 15 and 17, a liquid crystal layer 302 including a vertical alignment inducer 602 and liquid crystal molecules 312, 322 having negative dielectric anisotropy are interposed between the upper substrate and the lower substrate (S240). In this case, the liquid crystal layer 302 is formed through the liquid crystal dropping process and both substrates may be bonded, or alternatively, the liquid crystal injection process may be used after bonding both substrates.

The liquid crystal molecules in the liquid crystal layer 302 include first liquid crystal molecules 312 adjacent to the surface of the alignment film 402, and second liquid crystal molecules 322 adjacent to the surface of the common electrode CE. In the initial state in which no electric field is formed, the first liquid crystal molecules 312 may be substantially vertically aligned by the vertical alignment group of the alignment film 402.

After bonding, an annealing process may be performed to improve the spreading characteristics and uniformity of the liquid crystal molecules LC.

Meanwhile, after forming the liquid crystal layer 302, a heat treatment process of applying heat from the bottom of the lower substrate is performed. The photo-curable agent 502 contained in the alignment film 402 may be eluted to the liquid crystal layer 302 as a result of the heat treatment process. The heat treatment process may also be performed after forming the vertical alignment inducing layer 652. Although it is not illustrated in the drawings, some of the photo-curable agent remains on the surface of the alignment film without being eluted to the liquid crystal layer and photo-curing may occur.

Figure 18A:
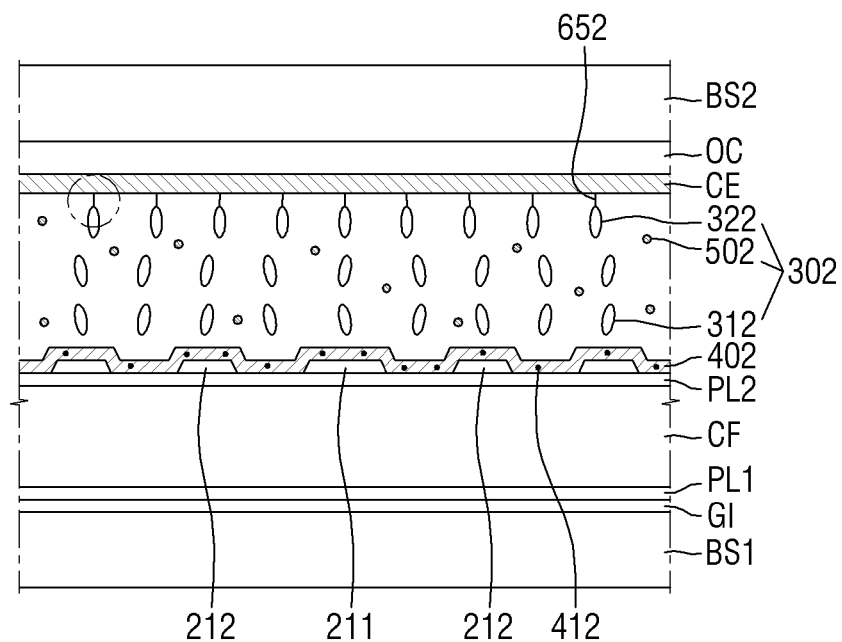
FIG. 18(B) is an enlarged view of the circled portion of FIG. 18(A).
Figure 18B:
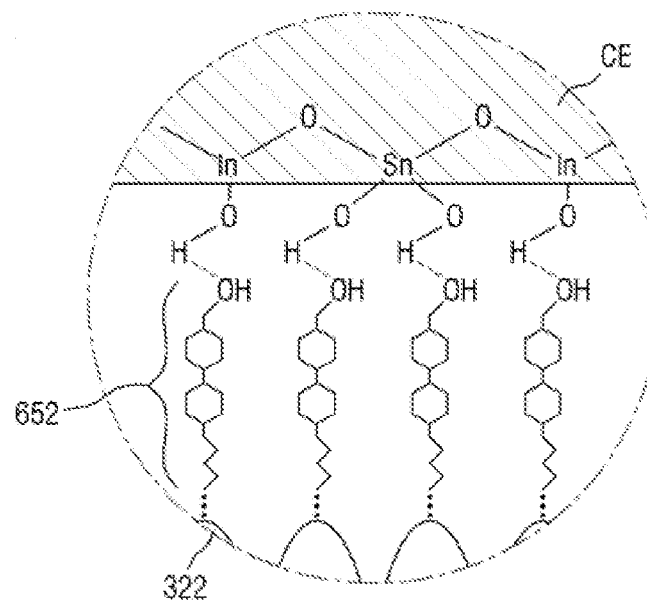
Figure 19:
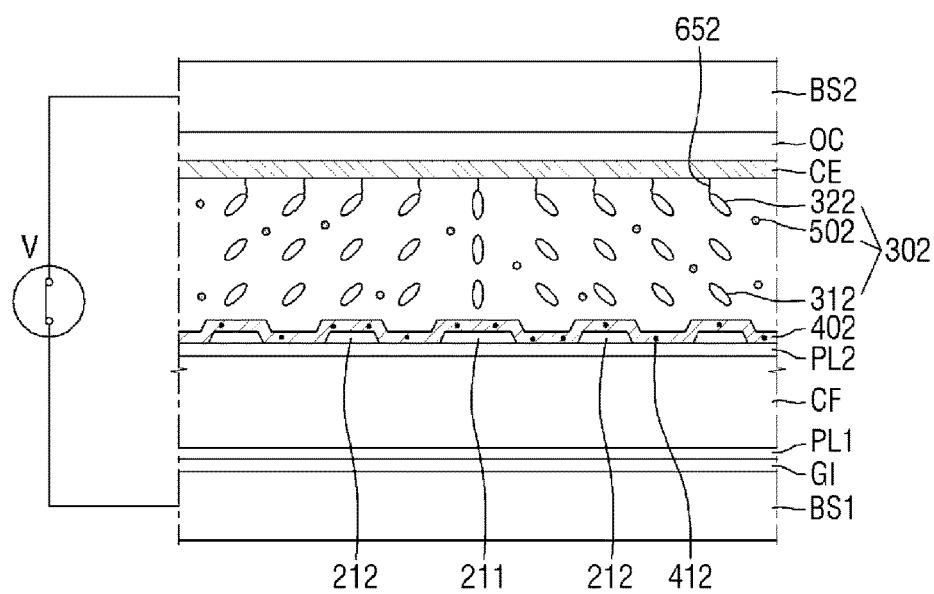

Referring to FIGS. 18(A) and 18(B), in which FIG. 18(B) is an enlarged view of the circled portion of FIG. 18(A), after forming the liquid crystal layer 302 which contains the vertical alignment inducer 602, the vertical alignment inducing layer 652 may be formed on the surface of the common electrode CE. The vertical alignment inducer 602 does not form the vertical alignment inducing layer on the surface of the alignment film 402, and may selectively form the vertical alignment inducing layer 652 only on the surface of the common electrode CE Next, referring to FIGS. 15 and 19, by forming an electric field between the lower substrate and the upper substrate of the liquid crystal display device, the liquid crystal molecules LC may be obliquely aligned in a direction perpendicular to the electric field formed between the common electrode CE and the pixel electrodes 211, 212 (S250).

Figure 20:
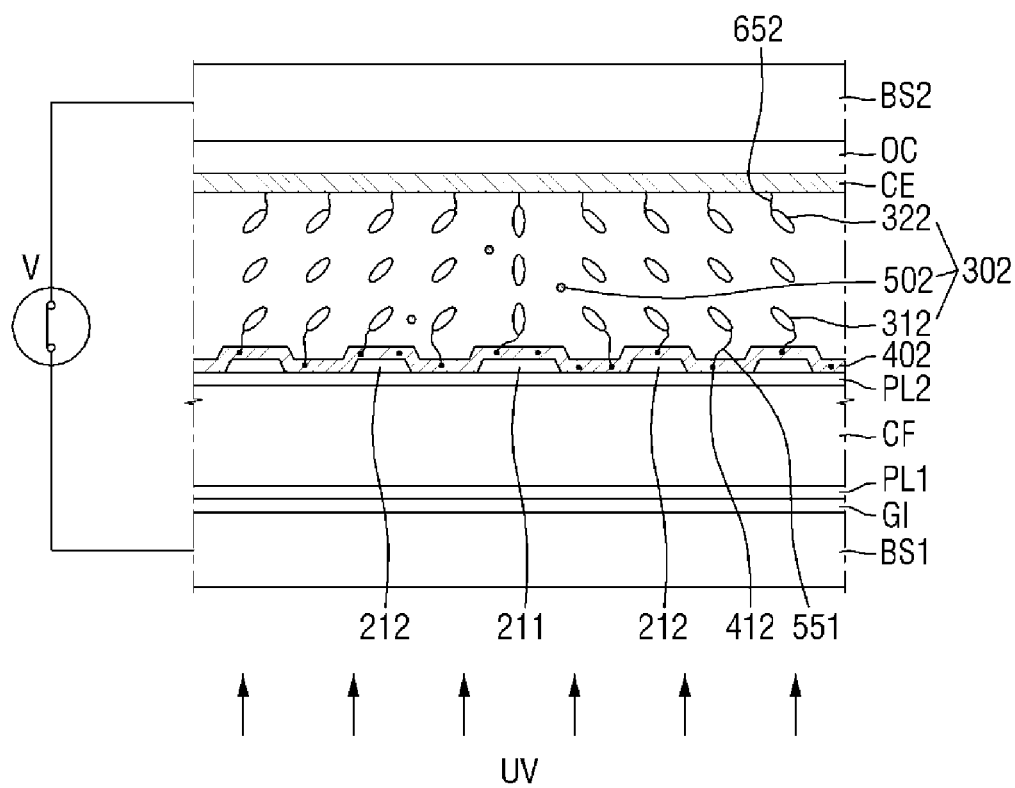

Next, referring to FIGS. 15 and 20, by irradiating with ultraviolet (UV) light at the same time in which the electric field is formed, the photopolymerization reaction of the photo-curable agent 502 by the polymerization initiator 412 contained in the alignment film 402 is initiated, and the photo-curable layer 552 is formed (S260). The photo-curable agent 502 may be, for example, a reactive mesogen. The photo-curable layer 552 may be a polymer compound formed when single molecules containing the vertical alignment group and the photo-curable agent 502 are chemically bonded to each other. That is, the photo-curable layer 552 is cured in the tilted direction of the vertical alignment group of the first liquid crystal molecules 312 and the alignment film 402.

Figure 21:
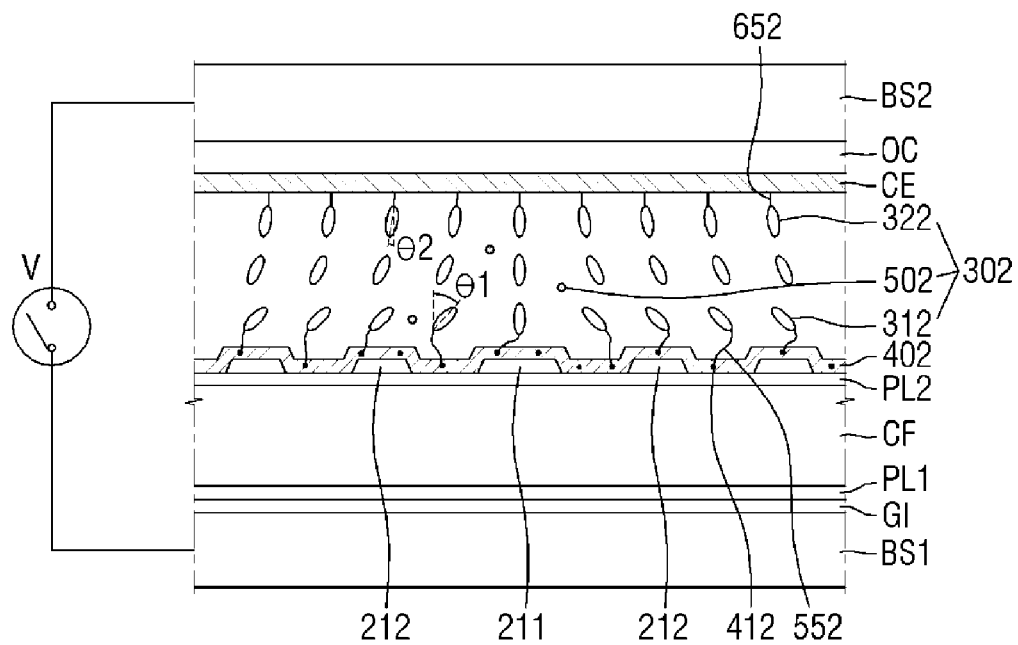

FIG. 21 is a diagram illustrating that the alignment direction of the first liquid crystal molecules 312 is fixed or stabilized by the pre-tilt photo-curable layer 552. That is, even when no electric field is formed or present, the first liquid crystal molecules 312 have a first pre-tilt angle θ1, and meanwhile, the tilted alignment of the second liquid crystal molecules 322 is not maintained when the electric field is canceled and the second liquid crystal molecules are substantially vertically aligned to have a second pre-tilt angle θ2 smaller than the first line pre-tilt angle θ1.

Figure 22:
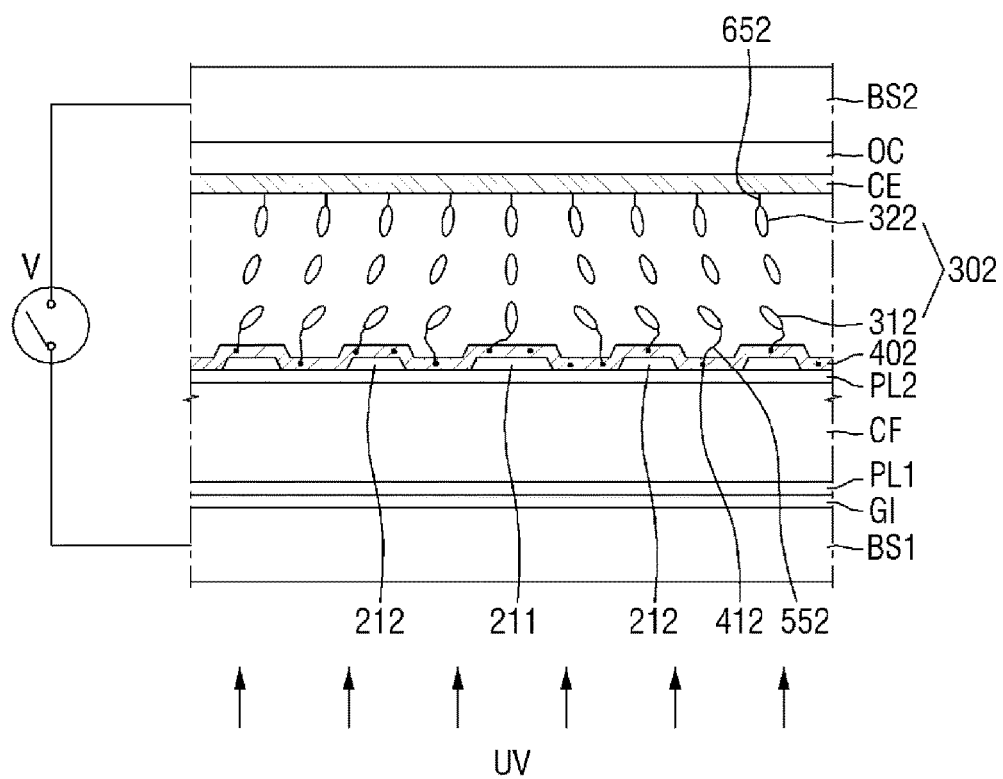

Referring to FIGS. 15 and 22, ultraviolet light is irradiated again in a state in which no electric field is formed (i.e. absent) to remove the remaining photo-curable agent 502 (S270). Thereafter, although not illustrated, it is possible to manufacture a curved liquid crystal display device through the process of bending both ends of the liquid crystal display device. The method of manufacturing a liquid crystal display device according to this embodiment has an effect of being able to reduce the manufacturing cost, by utilizing a liquid crystal composition which does not contain the photo-curable agent.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A liquid crystal display device comprising:
a first substrate;
a second substrate facing the first substrate;

a liquid crystal layer interposed between the first substrate and the second substrate, the liquid crystal layer comprising liquid crystal molecules;

an alignment film disposed between the liquid crystal layer and the first substrate;

a pixel electrode disposed between the alignment film and the first substrate;

a photo-curable layer between the liquid crystal layer and the alignment films;

a common electrode disposed between the liquid crystal layer and the second substrate; and a vertical alignment inducing layer between the common electrode and the liquid crystal layer, wherein the vertical alignment inducing layer comprises a self-aligned vertical alignment inducer, and wherein the vertical alignment inducer comprises a hydrophilic group and an affinity liquid crystal group having a high affinity with the liquid crystal molecules.

2. The liquid crystal display device of claim 1, wherein the vertical alignment inducing layer is disposed on a surface of the common electrode.

3. The liquid crystal display device of claim 2, wherein the hydrophilic group of the vertical alignment inducer is aligned in a direction of the common electrode, the affinity liquid crystal group of the vertical alignment inducer is aligned in the direction of the liquid crystal layer, and the vertical alignment inducer is self-aligned vertically with respect to the surface of the common electrode.

4. The liquid crystal display device of claim 1, wherein the hydrophilic group comprises one or more of a hydroxyl group, an amino group and a thiol group.

5. The liquid crystal display device of claim 1, wherein the alignment film comprises polyimide having a main chain and one or more side chain, wherein the main chain of the polyimide comprises a repeating unit comprising an imide group, and at least a portion of the side chain comprises a side chain substituted by a vertical alignment group and a side chain substituted by a polymerization initiator.

6. The liquid crystal display device of claim 5, wherein the photo-curable layer is a reaction product of a photo-curable agent and the polymerization initiator.

7. The liquid crystal display device of claim 6, wherein the photo-curable agent comprises a reactive mesogen.

8. The liquid crystal display device of claim 5, wherein the side chain substituted by the vertical alignment group has a pre-tilt.

9. The liquid crystal display device of claim 1, wherein the liquid crystal molecules have negative dielectric anisotropy, the liquid crystal molecules comprise first liquid crystal molecules adjacent to the photo-curable layer and second liquid crystal molecules adjacent to the vertical alignment inducing layer, the first liquid crystal molecules have a first pre-tilt angle with respect to the first substrate when an electric field is not present, and the second liquid crystal molecules have a second pre-tilt angle smaller than the first pre-tilt angle with respect to the second substrate.

10. The liquid crystal display device of claim 9, wherein the second pre-tilt angle is from 0° to 2°.

11. The liquid crystal display device of claim 1, wherein the pixel electrode is a pattern electrode having a slit pattern, and the pixel electrode comprises a plurality of domains in which alignment directions of the liquid crystal molecules are different from each other.

12. The liquid crystal display device of claim 1, wherein one or more of the first substrate and the second substrate are bent.

* * * * *